United States Patent
Carnahan et al.

(10) Patent No.: US 10,252,158 B1
(45) Date of Patent: Apr. 9, 2019

(54) DISTRIBUTED SYSTEMS FOR DELIVERING MEMORY-EFFICIENT, CUSTOMIZABLE, AND USER-AWARE CONTENT

(71) Applicant: Microsoft Technology Licensing, LLC, Redmond, WA (US)

(72) Inventors: Jeffrey D. Carnahan, Redmond, WA (US); Andrew C. Hampton, Redmond, WA (US); Jeremy M. Hill, Redmond, WA (US); Christopher M. Blohm, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/436,561

(22) Filed: Feb. 17, 2017

Related U.S. Application Data

(60) Provisional application No. 62/412,829, filed on Oct. 25, 2016, provisional application No. 62/409,356, filed on Oct. 17, 2016.

(51) Int. Cl.
*A63F 13/355* (2014.01)
*H04L 29/08* (2006.01)
*A63F 13/69* (2014.01)

(52) U.S. Cl.
CPC ............ *A63F 13/355* (2014.09); *A63F 13/69* (2014.09); *H04L 67/10* (2013.01)

(58) Field of Classification Search
None
See application file for complete search history.

(56) References Cited

U.S. PATENT DOCUMENTS

| | | | |
|---|---|---|---|
| 9,561,433 B1 * | 2/2017 | Pieron | A63F 13/35 3/35 |
| 9,744,445 B1 * | 8/2017 | Pieron | A63F 13/12 |
| 2005/0021401 A1 * | 1/2005 | Postrel | G06Q 30/02 705/14.3 |
| 2005/0143166 A1 | 6/2005 | Walker et al. | |
| 2006/0277100 A1 | 12/2006 | Parham | |
| 2009/0061991 A1 | 3/2009 | Popovish et al. | |
| 2009/0131158 A1 | 5/2009 | Brunet de Courssou et al. | |
| 2011/0313827 A1 | 12/2011 | Lobb et al. | |
| 2013/0084962 A1 | 4/2013 | Radisich et al. | |
| 2013/0210511 A1 | 8/2013 | Larocca et al. | |
| 2013/0226685 A1 | 8/2013 | Smith, Jr. et al. | |
| 2014/0018157 A1 | 1/2014 | Kern et al. | |

(Continued)

OTHER PUBLICATIONS

Lorenz et al., "Video game training and the reward system," *Frontiers in Human Neuroscience*, vol. 9, Article 40, 9 pp. (Feb. 2015).

*Primary Examiner* — Ronald Laneau
(74) *Attorney, Agent, or Firm* — Klarquist Sparkman, LLP

(57) ABSTRACT

The disclosed technology concerns methods, apparatus, and systems for delivering content in a distributed computing system. In particular, the disclosed technology concerns tools and techniques for selecting and delivering customizable and user-aware content in a memory-efficient manner. For example, embodiments of the disclosed technology use a centralized backend computing device to implement a system that communicates with one or more client computing devices (e.g., PCs, gaming consoles, mobile devices, and the like). The centralized backend computing device(s) can be configured to compute and transmit content that is adaptive and customizable.

19 Claims, 13 Drawing Sheets

(56) References Cited

U.S. PATENT DOCUMENTS

| | | |
|---|---|---|
| 2014/0272847 A1 | 9/2014 | Grimes et al. |
| 2014/0274322 A1 | 9/2014 | McDonald et al. |
| 2014/0358260 A1 | 12/2014 | Burgin et al. |
| 2015/0011286 A1* | 1/2015 | Kim .................... G07F 17/3244 463/17 |
| 2015/0371504 A1 | 12/2015 | Guinn et al. |

\* cited by examiner

- w: n → Weight: n
- X | Y → w: n → If user has X or Y then weight: n
- X & Y → w: n → If user has X and Y then weight: n

1100

```
Vehicle Pack – ID #1234                                grant

Closed:    4 - 3 ($), 1 (Cr), 0 (Prog), 0 (Other)
    Open:      3 - 0 ($), 1 (Cr), 0 (Prog), 2 (Other)

UNSC Pack – ID #1250                                   grant

Closed:    0 - 0 ($), 0 (Cr), 0 (Prog), 0 (Other)
    Open:      3 - 2 ($), 0 (Cr), 1 (Prog), 0 (Other)
```

Vehicle Pack                                                                                  grant

Summary:
  Closed:  5 - 3 ($), 2 (Cr), 0 (Prog), 0 (Other)
  Open:    4 - 0 ($), 1 (Cr), 1 (Prog), 2 (Other)

Marketplace Status:
3 units, updated: 05/23/2014 @ 14:52 UTC

Pack Instance History:

| Id    | State  | Source      | Acquired Date         | Acquisition Reason   | Opened Date           |
|-------|--------|-------------|-----------------------|----------------------|-----------------------|
| ef0...| Closed | Credits     | 5/20/2014 @ 18:24 UTC | Purchase @ 10 Cr     | --                    |
| 3b9...| Closed | Credits     | 5/21/2014 @ 03:17 UTC | Purchase @ 10 Cr     | --                    |
| 8ca...| Opened | Credits     | 5/10/2014 @ 03:33 UTC | Purchase @ 10 Cr     | 5/11/2014 @ 07:21 UTC |
| 153...| Opened | Progression | 5/17/2014 @ 09:01 UTC | Rank - Level 10      | 5/17/2014 @ 09:01 UTC |
| 257...| Opened | Other       | 5/07/2014 @ 14:23 UTC | Testing UNSC pack... | 5/07/2014 @ 14:25 UTC |
| 343...| Opened | Other       | 5/08/2014 @ 15:00 UTC | Another test...      | 5/08/2014 @ 15:15 UTC |

| Vehicle Pack – Instance 8ca0431b-1d84-4c23-893e-691114ca2c32 |||||||
|---|---|---|---|---|---|---|
| Summary: |||||||
| Id | State | Source | Acquired Date | Acquisition Reason | Opened Date ||
| 8ca... | Opened | Credits | 05/10/2014 @ 03:33 UTC | Purchase @ 10 Cr | 05/11/2014 @ 07:21 UTC ||
| REQs Provided: |||||||
| Id | REQ Name | Type | Consumed? | Consumed Date | Consumed Match Id ||
| 2f1... | ONI Emblem | Durable | -- | -- | -- ||
| 747... | Warthog Ordnance | Consumable | No | -- | -- ||
| 5ed... | Warthog Ordnance | Consumable | Yes | 05/15/2014 @ 10:01 UTC | 3f85... ||
| c41... | Mongoose Ordnance | Consumable | Yes | 05/15/2014 @ 10:22 UTC | 5c41... ||
| a73... | Mongoose Ordnance | Consumable | Yes | 05/15/2014 @ 10:41 UTC | 93a2... ||

FIG. 13

REQ Inventory for Player 1

| REQ Instance Id | Pack Instance Id | Pack Name | REQ Name | Type | Acquired Date | Acquisition Reason | Consumed? | Consumed Date | Consumed Match Id |
|---|---|---|---|---|---|---|---|---|---|
| 2f1... | 8ca03... | Vehicle Pack | Oni Emblem | Durable | 05/11/2014 @ 07:21 UTC | Pack Opened | -- | -- | -- |
| 747... | 8ca03... | Vehicle Pack | Warthog Ordnance | Consumable | 05/11/2014 @ 07:21 UTC | Pack Opened | No | -- | -- |
| 5ed... | 5ca03... | Vehicle Pack | Warthog Ordnance | Consumable | 05/11/2014 @ 07:21 UTC | Pack Opened | Yes | 05/15/2014 @ 10:01 UTC | 4f05... |
| c41... | 8ca06... | Vehicle Pack | Mongoose Ordnance | Consumable | 05/11/2014 @ 07:21 UTC | Pack Opened | Yes | 05/15/2014 @ 10:22 UTC | 5c43... |
| a73... | 8ca06... | Vehicle Pack | Mongoose Ordnance | Consumable | 05/20/2014 @ 15:52 UTC | Release the ... | Yes | 05/18/2014 @ 15:52 UTC | 93b0... |
| 32f... | -- | -- | Mark V Armor Suit | Durable | 05/13/2014 @ 04:23 UTC | Pack Opened | -- | -- | -- |
| 4d3... | b03d7... | UNSC Pack | Rocket Ordnance | Consumable | 05/13/2014 @ 04:23 UTC | Pack Opened | No | -- | -- |
| 54b... | b03d7... | UNSC Pack | | | | | | | |

DISTRIBUTED SYSTEMS FOR DELIVERING MEMORY-EFFICIENT, CUSTOMIZABLE, AND USER-AWARE CONTENT

CROSS-REFERENCE TO RELATED APPLICATIONS

This application claims the benefit of U.S. Provisional Application No. 62/409,356 filed on Oct. 17, 2016; and U.S. Provisional Application No. 62/412,829 filed on Oct. 25, 2016, both of which are incorporated herein by reference.

FIELD

This application relates to an intelligent framework for selecting and delivering customizable and user-aware content in a memory efficient manner.

SUMMARY

The disclosed technology concerns methods, apparatus, and systems for delivering content in a distributed computing system. In particular, the disclosed technology concerns tools and techniques for selecting and delivering customizable and user-aware content in a memory-efficient manner. For example, embodiments of the disclosed technology use a centralized backend computing device to implement a system that communicates with one or more client computing devices (e.g., PCs, gaming consoles, mobile devices, and the like). The centralized backend computing device(s) can be configured to compute and transmit content that is adaptive and customizable.

The disclosed methods, apparatus, and systems should not be construed as limiting in any way. Instead, the present disclosure is directed toward all novel and nonobvious features and aspects of the various disclosed embodiments, alone or in various combinations and subcombinations with one another.

In particular examples, the disclosed technology concerns methods, apparatus, and systems for selecting and awarding a user one or more digital rewards or other digital items. For instance, in one embodiment, data is input indicating a request to transition a digital reward pack from a closed state to an open state; a reward for the digital reward pack is selected from among two or more possible rewards using a weighted selection process in which a weight assigned to one or more of the possible rewards is dynamically determined in accordance with a set of one or more weighting rules that are applied after the data indicating the request is received; and data is output indicating the reward selected.

In another example embodiment, at a first time, an instance of a digital rewards package is acquired comprising one or more reward rules that represent a reward to be granted; and, at a second time, and responsive to a user selecting to reveal contents of the instance of the digital rewards package, respective rewards are determined for each of the one or more reward rules.

In yet another example embodiment, a dynamic digital rewards system is performed that (a) supports one or more remote clients and thereby reduces memory overhead, processing overhead, or both at the one or more remote clients, and (b) provides digital rewards according to a rewards framework that is modifiable without updating executable code stored at the one or more remote clients.

The innovations can be implemented as part of a method, as part of a computing system configured to perform the method, or as part of computer-readable media storing computer-executable instructions for causing a processing device (e.g., a circuit, such as a microprocessor or microcontroller), when programmed thereby, to perform the method. The various innovations can be used in combination or separately.

The foregoing and other objects, features, and advantages of the disclosed technology will become more apparent from the following detailed description, which proceeds with reference to the accompanying figures.

BRIEF DESCRIPTION OF THE DRAWINGS

FIG. 11 is a schematic diagram showing an example interface for viewing all packs currently held by a player.

FIG. 12 is a schematic diagram showing an example interface for viewing all instances of a particular pack that are associated with a player.

FIG. 13 is a schematic diagram showing an example interface for viewing the details of a specific pack instance that is associated with a player.

FIG. 14 is a schematic diagram showing an example interface for viewing all Reqs acquired and consumed by a player.

DETAILED DESCRIPTION

I. General Considerations

Figure 1:
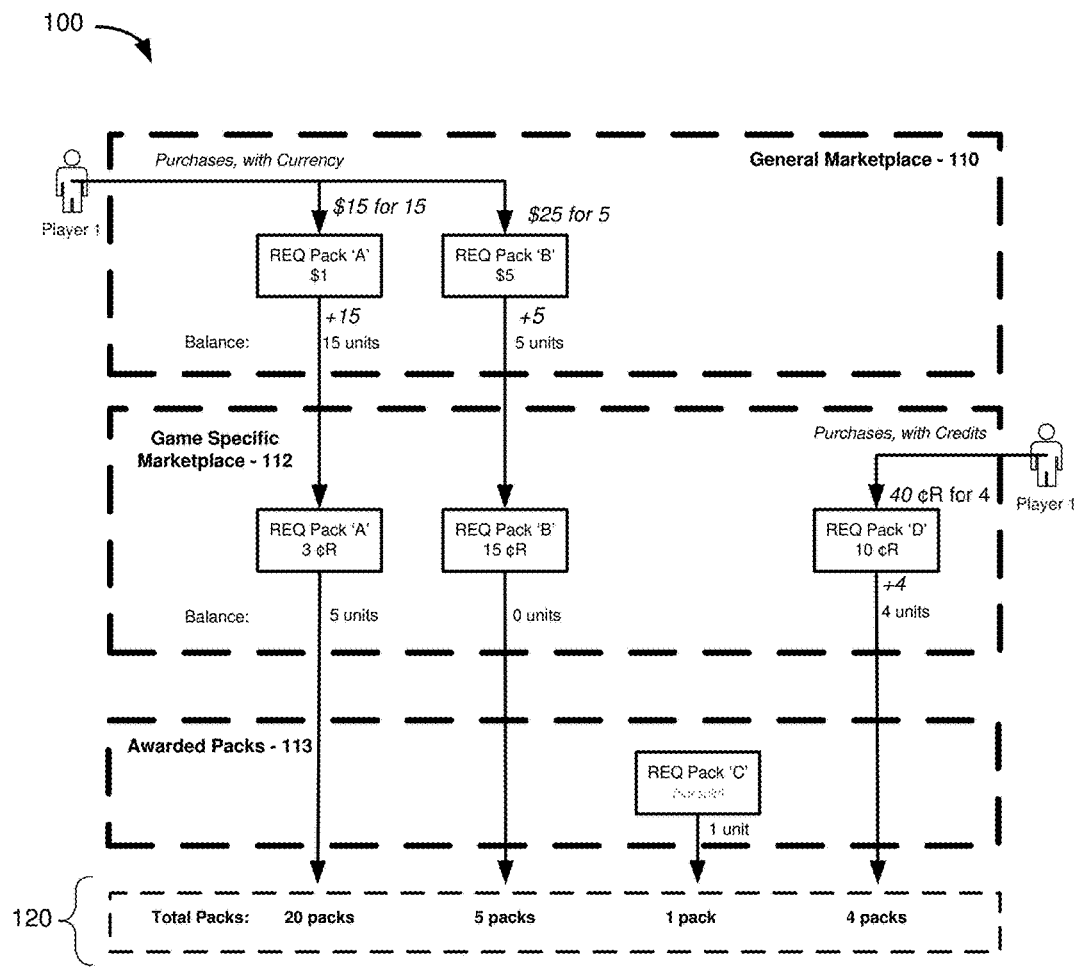
FIG. 1 is a schematic block diagram that illustrates an example scenario for purchasing digital rewards in accordance with the disclosed technology.

Disclosed below are representative embodiments of methods, apparatus, and systems for selecting and awarding a user one or more digital rewards or other digital items. The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the figures may not show the various ways in which the disclosed methods can be used in conjunction with other methods.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

II. Introduction to the Disclosed Technology

Digital reward systems (such as those used in video games and other interactive software experiences) are a new and burgeoning design feature. Traditionally, however, such reward systems use a very simplistic method of granting rewards by randomly selecting an award from a fixed table of offerings. Further, reward systems are typically hard coded entirely into the software that is executed on the end user's device (e.g., gaming console, PC, mobile device, etc), making it impossible to create new rewards or new reward mechanisms without updating the executable code itself. Moreover, such systems are not capable of being adaptive to a user's current (present) state in the application or game.

Thus, traditional reward systems suffer from a variety of drawbacks. For example, such traditional systems offer a substandard player experience insofar as the systems are simplistic and do not adapt: to a user's current game state (e.g., a player's current inventory in a video game), to a user's preferences, to any historical trends or observations, and/or to any other factors outside of the simple random selection from a static, fixed table.

Additionally, such traditional systems are wasteful of valuable computing resources and time as they require software updates in order to change. Such software updates are computationally burdensome and unnecessarily consume memory resources. Additionally, such software updates sometimes require user selection and acceptance to implement, making them difficult to control from the developer's perspective.

Still further, such traditional systems fail to use any remote computing services (e.g., cloud-computing resources) to not only enhance the user experience by providing customization and adaptation possibilities but also to reduce the computational and memory burden of storing and providing the rewards system locally at the end user's device.

Additionally, such traditional systems provide limited monetization possibilities insofar as they offer no customization directed toward player-specific attributes or directed toward moment-in-time offers (e.g., digital rewards tailored to reflect a current event or player state).

By contrast, embodiments of the disclosed technology use a centralized backend computing device (e.g., one or more central servers, such as cloud-based servers that are configured to provide and scale application services on demand using various cloud technologies, such as virtual machines and the like) to implement an intelligent rewards system that communicates with one or more client computing devices (e.g., PCs, gaming consoles, mobile devices, and the like). The centralized backend computing device(s) can be configured to compute and transmit rewards that are adaptive and customizable.

In some examples, the likelihood of available rewards being selected by the centralized backend are weighted and react to prior rewards that were granted. Additionally, in some examples, the odds (or likelihood) of having a particular award selected are adaptive based on specific player trends and/or player population trends. The use of pools and weights as well as keywords, which are all discussed in more detail below, allows for an application developer (e.g., a video game developer) to have broad flexibility to tune the reward system to reward the players while still incorporating an element of random chance to the process. For example, data collected from a player population may indicate that a particular item (e.g., a particular vehicle, weapon, armor, or other attribute) is more powerful relative to other items or perhaps is being used in an unexpected and undesirable manner from the developer's perspective. In such cases, the likelihood of being rewarded that item can be reduced. Such weighting reduction can help create a more even and fair gaming environment where player skill is promoted over game chance while still offering the excitement and effect of a reward system. Alternatively, data collected from a player population may indicate that use of a particular item increases other key product metrics (e.g., monetization, depth or length of engagement, social activities, or other qualities). In such cases, the likelihood of being rewarded that item can be increased when doing so does not significantly harm other metrics (e.g., the perception of fair play, or engagement/monetization from players who did not acquire and/or use that item).

Through the combination of metrics, initial tuning, and machine learning, some example embodiments of the disclosed reward systems automatically hone in on specific rewards and reward frequencies that motivate player behavior for continued use. For instance, embodiments of the disclosed technology can use feedback (e.g., generated from collected data that evidences player behavior) to continue to refine the rewards based on heuristics and goals of the behaviors a developer may wish to incentivize. In particular example implementations, this evaluation of stimuli and signaling for rewards and their respective weights occurs in a central server remote from the end user's devices (e.g., a server in a scalable cloud-computing environment), while the end user's device (e.g., game console, PC, mobile device, or the like) is responsible for the presentation to the user of the reward based on cloud computed decisions. In certain embodiments, machine learning is employed to adjust weightings of reward delivery. That said, embodiments using machine learning can be bounded and/or overridden by developers to keep weights at a limit or level that are consistent with a developers's goals (e.g., to keep a particular game "fun" or "balanced" (or some combination thereof) from the viewpoint of the user).

Still further, for a new user to a particular application (e.g., a first-person-shooter game), the disclosed technology can recognize the player as a new player and more aggressively provide them with rewards packages that allow them to more fairly compete with experienced player in a particular environment. For instance, the rewards system can be customized to more aggressively reward new players with weapons and upgrades that the existing player base has already received (e.g., thereby helping to level the playing field for newcomers).

Or, as another example, embodiments of the disclosed technology can track spending of a player and prioritize the player's preferred rewards over the player's less-preferred rewards. For instance, a reward type typically preferred by a player can be granted more aggressively to that player so as to increase their enjoyment and engagement in the game.

Still further, embodiments of the disclosed intelligent digital rewards system can self adjust to one or more factors in a dynamic fashion. Such self-adjustment allows a developer to save time and effort within a development team by avoiding the need to monitor and adjust the reward system. Instead, the disclosed technology creates a flexible and intelligent reward framework that enables a flexible, memory-saving, processor-burden-saving approach to digital reward management and/or distribution.

As noted, machine learning can also be used to assist with the disclosed technology. For instance, machine learning can be used to determine trends, segmentations, and/or stimuli that would not otherwise be apparent, thereby further increasing player enjoyment and retention. In some example implementations, as a foil to runaway rewards, overall match telemetry can be correlated with the reward feedback loop to highlight potential imbalances, problems, and/or causes of anti-social behavior.

Additionally, in certain implementations, the adaptive reward system of the disclosed technology can be used to influence players from quitting an application (e.g., leaving a game). For instance, when it is detected that a player is likely to leave a game for another, the weightings of rewards can be modified to offer better rewards for that player. Embodiments of the adaptive reward system disclosed herein can also be used to influence players to play longer than they might normally play (e.g, by providing better rewards after an average play time for a player has been exceeded) or to engage players in different gameplay modes or play styles than normally exhibited by the player (e.g., by providing rewards tailored for use toward a particular gameplay mode or play style).

More generally, the disclosed technology provides a flexible and customizable framework for a reward system that allows application designers (e.g., game designers) to generate meaningful rewards while also providing mechanisms for keeping the reward fresh and interesting. With traditional methods, the designer must manually configure rewards based on a perceived value before the game ships based on personal experience and industry trends. By contrast, with embodiments of the disclosed technology, the reward generating process can be performed by a central server (e.g., a cloud-based server), greatly expanding the flexibility by which the application generates appropriate rewards for users of varying skill levels, play styles, and/or backgrounds and the flexibility by which game designers can tune, modify, and expand the reward generation process.

III. Overview of Example Embodiments

The disclosed technology has particular application to game applications that are executed on an end user's computing device (e.g., gaming console, PC, mobile device, or the like) and that also communicate with a remote computing device during game execution (e.g., gaming applications that are supported in-game by one or more remote (e.g., cloud-based) servers). The disclosed technology also has particular application to situation where an end user's computing device communicates with a game host (e.g., implemented by a cloud-based server) to facilitate a multiplayer environment where the game host further communicates with a further remote server to provide digital reward services to the game host. Such communication can be performed, for example, via the internet (e.g., using the HTTP protocol) or other network connection. With such cloud-to-client configurations, numerous technical and internet-centric advantages can be enjoyed, including the ability to share computational resources (thereby reducing local computational process load), the ability to share memory resources (thereby reducing local memory resource load), the ability to scale resources in the cloud as needed by the local client (e.g., by provisioning one or more virtual machines in a cloud-computing system to provide the described functionality), the ability to provide developer flexibility through modifications performed at a back-end server without the need for local updates, the ability to provide rewards that are context-aware based on past events and/or behavior rather than purely deterministic non-contextual tables, and/or the ability to provide new rewards and/or rules for selecting rewards without modifying any executable code at the end user's device.

For instance, in some embodiments, the context that influences the reward selection process is player based (e.g., a particular player's past actions, achievements, and/or preferences). In other embodiments, the context that influences the reward system is based on multiple players (e.g., the player population as a whole, or a subset thereof that exhibits similarities to the target player in some vein (such as purchasing habit, gameplay style, skill, and/or the like)). In still other embodiments, the context that influences the reward is a combination (e.g., a weighted combination) of both player-based criteria or player population criteria.

Further, for illustrative purposes, the disclosed technology is discussed with reference to a reward system that uses a "Pack" (or "pack") of virtual cards to represent the various digital rewards (also referred to herein as "Requisitions", "requisitions", "Reqs", or "reqs") awarded (e.g., a card-based reward system designed for use in a multiplayer gaming environment, such as Halo Arena or Halo Warzone available with Halo 5: Guardians). These examples are for illustrative purposes only and are not limiting in any way. Indeed, the principles of the technology can be more broadly applied to any application or video game in which a reward system is desirably utilized (e.g., as providing a mechanism for selecting and providing any type of digital bonus (or reward) to a user).

In one example implementation, players are awarded "Packs" of rewards. In this example, a Pack is considered a closed box. Players can receive the closed box as a reward for engagement with the game. Alternatively, players may purchase a Pack using a virtual currency or real currency. Once the Pack is received, players can choose to open it to discover the rewards "inside". The rewards may include digital currency so the player may purchase additional Packs (or other virtual goods). The rewards may include items the player can equip for personalization purposes (e.g., a unique armor). The rewards may include abilities the player may use at any time (e.g. ability to run faster or commandeer vehicles). The rewards may include consumable items the player may use in game (e.g. a box of rocket launchers, ammunition, or one-time ability upgrade). The rewards may also include a consumable reward that temporarily affects a player attribute (e.g., an "experience boost" card that temporarily accelerates the rate at which a player earns other rewards (usually experience points (XP) or credits). The rewards may also include a durable "leveling" reward. A durable levelling reward may increase a player's skill in some particular area (e.g., by a fixed amount). The reward may be received again, resulting in a further increase in the player's skill. In this sense, the rewards can be "stacked" with one another. In some cases, availability of durable levelling rewards for a particular attribute may be modified based on whether the player has previously been rewarded and applied the reward (e.g., the availability of a "marksman" durable levelling reward may be limited to three so that a player cannot become too accurate through the use of such rewards). Any of the rewards may also be subject to a particular criteria that the player must satisfy before being awarded the reward (e.g., "win a game, get an extra 200 credits").

In accordance with certain embodiments, when a player opens a Pack (e.g., by selecting it from the player's inventory), a series of rules are evaluated to determine what rewards to grant the user. As noted above and explained elsewhere herein, the evaluation of the rules can be performed at a centralized backend computing device (e.g., one or more cloud-based servers). The rules are defined by game designers and, by modifying or otherwise tuning the reward system at the centralized server, may change—even after the game has shipped.

In some embodiments, the rules allow designers to control what rewards the player receives. For example, designers can theme the rewards to the type of Pack the player has via Keywords (e.g. a "Vehicle" Pack might include only rewards related to vehicle play, whereas a "Weapons" Pack might include only rewards related to combat). In certain example implementations, the rewards are determined using weighted determinations. The weights, for example, can provide a mechanism for rarity (e.g., perhaps 1 out of 1000 Vehicle Packs contain an exotic vehicle). The keywords allow a generic modeling component (e.g. all vehicles) to be reused in Packs that output items with different themes (e.g. one Pack can be configured to output only motorcycles, while another can be configured to output only off-road vehicles while both reuse the same vehicle modeling component).

By using embodiments of the disclosed technology, designers have control over the quantity of rewards inside each Pack as well as the odds of such rewards being selected. This quantity can be dynamically altered by the designer after the shipping and installation of an application (e.g., game) by allowing for the quantity of rewards in a certain reward package (or "Pack") to be altered by a designer controlling a central system (e.g., a cloud-based server system supporting the application) with which one or more remote clients that operate as a game host or that execute the application communicate. Designers can also set weight modifiers at the central system that increase or decrease the likelihood of receiving certain rewards based on what the player already has (e.g., Packs can be configured not to output a second "Gold Armor Suit" if the player currently has one, or a Pack can be configured to only output a gold weapon skin if the player already has the gold armor suit). Using a combination of factors, the weight modifiers can also be used to influence the quantity of rewards.

In some embodiments, the rules account for a player's traits or behavioral history (e.g. the player prefers using a Shotgun, so rewards could contain shotgun ammunition more prevalently; or perhaps a player prefers playing games that do not involve vehicles; or perhaps the player hasn't completed the game on the highest difficulty and shouldn't be eligible for the best rewards). The rules can also account for a population of players' traits or behavioral history. For instance, a player may be identified as being similar to one or more other players based on play habit, preference, and/or other criteria. One or more characteristics of the identified player group can then be used as factors in weighting rules that control reward selection in accordance with embodiments of the disclosed technology.

IV. Detailed Examples

In accordance with certain embodiments of the disclosed technology, Requisition Packs (also referred to as Req Packs) provide players with a means of obtaining Req Cards (also referred to as Cards). Cards can be collected, used in-game, or used to accelerate a players progression. Packs may be earned (e.g., through progression), purchased using virtual currency (e.g., Credits, such as those earned through gameplay), or purchased using real-world currency (e.g., through an online marketplace, such as Xbox Live).

The following sections describe the overall functionality for certain example embodiments and describes how the functionality can be supported by a remote server providing remote services (e.g., a cloud server configured to communicate with a game host (which may be a virtual machine executing on a cloud-based server) or a local device executing the game (such as via the internet or other network connection)). An illustrative example of the remote services is "Halo Services", which supports certain multiplayer modes of Halo games. This usage, however, is by way of example only, as the technology can be adapted for a wide range of other games or applications in which digital reward systems are implemented.

The description below often refers to a "Req" or "Requisition". In general, a "Req" is a digital reward corresponding to an item of value. In some embodiments, a Req is obtained when a "Req Pack" is opened. In certain example embodiments, Reqs may be consumable (e.g. "50 sniper bullets"), or durable (e.g. "Sniper Emblem"); other types of Reqs are also possible. In general, a "Req Pack" is a collection of one or more Reqs. Packs are often purchased, but may be given out or made available in-game as a reward. Req Packs are configurable in a number of ways (e.g. to restrict availability or to increase rarity). Not all Packs will have the same number of Reqs, some will have more, some less. When obtained, and in certain example implementations, a Req Pack is "closed" from an end-user perspective. That is, the contents are not known (and will not be selected (e.g., by the remote services provided by a cloud-based server) until the user takes action to "open" the Pack. In the particular examples described below, a Req Pack is modeled as having one or more rules, each with associated "pools" that encompass further rules for selecting one or more respective rewards (Reqs). When an instance of Req Pack is opened, each rule is evaluated, resulting in the selection of a pool. The rules within the pool are then executed. These rules adjust the weights of various reward "slots", and then select a slot amongst those that remain eligible for selection. If a slot is selected, the player receives one or more associated rewards (Reqs). As noted, a reward can durable. Such rewards are called "durable rewards" or "durable cards" (in card-based implementations). A durable reward is a Req that cannot be used or consumed. Once obtained, they stay in the users' inventory permanently. Durable cards may illustrate a reward (e.g. "Unlocked Oni Emblem"), illustrate an ability (e.g. "Rocket Proficient"), or simply serve as a trophy or collectable. A "consumable reward" or "consumable card" is a Req that is removed from a player's Req inventory once used. For example, playing a "Drop Squad" card to have a team of musketeers airlifted into the game would be consumed after it's played. The description below also refers to "Credits" and "Currency". In general, "Credits" refers to an in-game currency that can be used for purchasing Req Packs. Credits can be earned through gameplay (e.g., using a system such as those used to award experience points (XP)). As known by those skilled in the art, credits may also be referred to as "soft currency", or "grind currency". "Currency" refers to a real-world currency (also known by those skilled in the art as "hard currency"). The actual real-world currency will depend on the associated online marketplace (e.g., a user's Xbox Live account) and its associated real-world currency (e.g., US Dollars for US accounts or Yen for Japanese accounts). Currency can also be used to purchase Req Packs. References to "Currency" refer to hard currency unless explicitly stated otherwise in this disclosure. The description below also refers to an "In-Game Store", which is an in-game location where the player can shop for and purchase Req Packs. One example aspect of a user visiting the in-game store allows for a user to view what Reqs and/or Req Packs they already have. It should be understood that other locations can also exist for purchasing Req Packs or Reqs, depending on the implementation.

A. Example User Scenarios

Before describing example implementations of the intelligent digital reward system in detail, this section introduces several example user scenarios that are supported by the system. These usage scenarios help illustrate the capability and functionality of embodiments of the disclosed reward system.

User Purchases a Req Pack.

Player 1 would like to improve his in-game character. He visits the In-Game Store which dispenses Req Packs. The store shows him a list of Packs available (e.g., 10 or any other number). On each, he sees a price displayed in Credits (e.g., in-game virtual currency) and in real-world Currency (e.g., a price in real-world denomination (such as U.S. dollars)). He opts to purchase the first Pack he sees using the real-world currency. He's presented with an online marketplace dialog explaining the charge which he accepts. The online marketplace then returns him to the game which shows him the purchase was successful.

User Opens a Req Pack.

In game, Player 1 visits the store or inventory screen that shows him what Req Packs he has. He sees that he has one unopened Pack and clicks on it to reveal its contents. The Reqs are revealed (e.g., 5 Reqs). In some examples, Player 1 is shown all his Reqs with the new ones highlighted and/or any changes to an existing card highlighted (e.g., such as an increase in level).

User Consumes a Req.

In game, Player 1 visits a store or inventory screen that shows him all the Reqs available. Player 1 selects a consumable Req (e.g., "Warthog Delivery") and clicks to redeem it. The store or inventory screen returns Player 1 to the game where he sees the redeemed Req (e.g., a fresh Warthog has been delivered). In some examples, Req redemption is dependent on a further factor, such as earning enough points or satisfying some other game criteria.

An Admin Reviews a User's Req History.

Andy the game administrator receives reports that Player 1 seems to be using Reqs unfairly in-game. Andy logs into the admin portal, enters identifying information for Player 1 (e.g., Player 1's gamertag) and clicks to view his Req Pack history. It reports that Player 1 has obtained a large number of Packs, most purchased with Currency, but a few purchased with Credits. Andy clicks to view what Reqs Player 1 obtained from these Packs, and sees that Player 1 has been very lucky and received 10 Rocket Launchers. Andy sees 5 of them were used in one game, and after reviewing the game statistics, notices the other players in the game were the ones that complained. Andy judges that nothing is amiss, and Player 1 legitimately used his Reqs in game.

A Designer Adds a Req Pack.

To celebrate an event (e.g., a holiday, a special event, etc.), Dan the developer would like to create a new Req Pack that should be available for the event (e.g., Halloween week). He supplies the required design and reward system configuration data (e.g., he configures a Req Pack, its related rules for selecting and delivering the customized Reqs, and image data for the relevant Pack and Reqs). For example, Dan may configure each slot of Req Pack to grant a Halloween themed item (e.g. pumpkin carving sword, orange visor, or a spooky armor design). Prior to general release, Dan or Andy the game administrator gives himself preview permission, visits the in-game store and sees the new Pack. He is able to purchase the Pack and review how it functions in game. Satisfied with how it functions, he publishes the Pack for all.

B. Example Req Attributes

This section describes various attributes that a Req may have, any one or more of which may be present in an implementation of the disclosed technology. These example attributes are not to be construed as limiting in any way, as they illustrate the various characteristics that a Req may be exhibit.

| Attribute |
| --- |
| Req Pack Modeling Attributes: |
| A Req Pack can be defined (e.g., in a content management system (CMS) for application developers) with settings that govern its availability, rarity, cost and/or how it is obtained.<br>A Req Pack slot uses a weighted Req selection system (e.g., a 1-level weighted system, 2-level weighted system, 3-level weighted system, or n-level weighted system).<br>Req Packs may be purchased with Currency or Credits, or both, or neither.<br>Req Packs may be added after the game ships, without changes to the game.<br>Certain Req Cards may have usage restrictions. Possible examples: Some game variants may limit how many types of requisitions (e.g., vehicles) can be brought in, or perhaps restrict them altogether.<br>Boost cards may only be "playable" prior to when a game begins. There may be an overall limit to the value of the boosts in play at once.<br>These restrictions can be enforced by the game host (administrator). Req Pack contents can be themed. A keyword may be optionally specified on a pool of Reqs to restrict the output of the pool to only those Reqs with the matching keyword.<br>Weights used within the Req Pack definition may vary based on the contents of a player's Req inventory. For example, a player may only receive 'Rocket Launcher Ordinance' (consumable) cards if they have already received the 'Rocket Proficient' (durable) card.<br>Sales can be pre-scheduled. A Req Pack price change can be scheduled to go into effect in advance. Without this feature, and in some embodiments, price changes occur only when a human modifies the price and publishes the update. |
| Req Card Type Attributes: |
| A Req may be an inventory item (durable), (e.g. emblem, helmet, armor design, or "license"). A "license" is a Req that may do nothing other than exist in the players' inventory and serve to explain other progression elements.<br>A Req may be experience points (XP) or Credits.<br>A Req may be an XP-modifier token (double-XP).<br>A Req may be an ordinance (consumable), (e.g. weapon, overshield, drop squad or vehicle). When consumed the item appears in game.<br>A Req may be a 'boost'. Boost cards increase the amount of XP or Credits the player or the players' team earn at game end.<br>Combo Card: A Req may be a combination of two or more other Reqs. |
| Obtaining & Using Reqs Attributes: |
| A player may purchase Req Packs using Credits or Currency.<br>A player may purchase Req Packs while in-match.<br>A player may open a Pack instance and view Reqs while in-match.<br>A player may consume Req instances while in-match.<br>Req instances are only marked as consumed if the remote service was able to successfully provide the Req to the player.<br>Certain Reqs may be put into effect before the match begins, such as Boost cards.<br>Commercial Partners may grant Req Packs to a player. These Packs or the Reqs they provide may be exclusive to the partner. |
| Earning Req Packs Attributes: |
| When a player ranks up, the rank may grant a Req Pack instance. |
| Admin Attributes: |
| A per-user detailed history of Credit transactions, Req Pack purchases, Reqs earned, and/or Reqs used can be maintained and available for authorized game admins to review.<br>Admins may grant any user any Pack (which may have randomized contents).<br>Admins may grant any user any Req. |
| Other Attributes: |
| Req Packs have per-user or user class availability. Examples:<br>A Grunt Pack may be only available to users that first kill 1000 grunts.<br>A "Senior Leader" Pack may be restricted to players who have rank > 10. |

C. Example Application Interactions/Scenarios

This section outlines a series of scenarios that can be implemented using embodiments of the disclosed technology. These scenario typically exercise the service APIs and unblock mainline integration. For instance, these scenarios typically involve the end user's or game host's device transmitting data (e.g., a service request) to a central server (e.g., a cloud server) using particular APIs (examples of which are provided below). At the central server, the data can be input and one or more back-end services can be performed. In some cases, responsive results are transmitted back to the end user's or game host's device for use in the application executing locally at the end user's device. The example scenarios are by way of example only and general concern a multiplayer match-based game.

Earn Credits.

When a match concludes, gameplay activity is taken into account and used to determine how many Credits they will receive. Users are shown a breakdown of how many Credits are awarded, and they are added to the players Credit balance.

Earn Req Packs.

When a player ranks up (via XP), they receive a designated Req Pack.

Purchase Req Pack (or Bundle of Req Packs) with Credits.

A player can enumerate Req Packs that are currently purchasable and sold via Credits. A player can purchase one Pack (or a bundle) using Credits.

Purchase Req Pack (or Bundle of Req Packs) with Currency.

A player can enumerate Req Packs that are currently purchasable & sold via Currency. A player can purchase one Pack (or a bundle) using Currency.

Open Req Pack.

A player can enumerate Req Packs that the player owns, but has not opened. A player can open one such Req Pack. Rules associated with the Pack can then select the one or more Reqs the player will receive. In particular embodiments, the rules are applied by a centralized back end computing device (e.g., one or more cloud-based servers), and the results of the selection are transmitted back to the player's computing device.

View Req Inventory.

A player can view their Req inventory and see durables and unused consumables.

Consume Req.

During a match, the game host can consume a Req on behalf of a player.

Purchase Season Pass.

A player can select to purchase a season pass in which one or more Req Packs are delivered to the player at two or more intervals of time (e.g., every week, every month, or every x number of days). A player can purchase the Season Pass with Credits or Currency. A Season Pass may provide players with exclusive Packs, Reqs, or increase the likelihood a player receives rare Reqs.

E. Design Overview

1. Purchase and List Reg Packs

In one example embodiment, users may purchase Req Packs through a general non-game-specific on-line marketplace that is supported remotely (e.g., Xbox Live (through the Marketplace)) and/or a game-specific interaction (e.g., using Credits) supported remotely by game-specific remote services (e.g., Halo Services).

FIG. 1 is a schematic block diagram 100 that illustrates an example scenario in which both Req purchasing possibilities are available and in which a user has made purchases from both. In particular, FIG. 1 shows a general online marketplace 110 that is not game specific and through which a player may purchase Reqs. The general online marketplace 110 can be supported by non-game-specific remote services (e.g., Xbox Live). In this example, two Req Packs are available, Req Pack "A" ($1 each) and Req Pack "B" ($5 each). FIG. 1 also shows a game specific marketplace 112 that can be supported by a game specific remote services (e.g., Halo Services). Further, in this example, the game specific marketplace supports Credit transaction rather than real Currency transactions. Thus, Credits earned in game can be used to purchase the offered Req Packs. In this example, only Req Pack "D" is offered for purchase with Credits. FIG. 1 illustrates a situation where Player 1 purchases 15 units of Req Pack "A" and 5 units of Req Pack "B" in the general marketplace 110 and also purchases 4 units of Req Pack "D" from the game-specific marketplace 112. These purchases are illustrated by showing additions to the player's existing balances.

Additionally, FIG. 1 illustrates that, in this example, additional Packs that are not available for purchase may have been awarded to the player 113. When the user views all Packs they have, they see the sum across 110, 112, and 113 (as shown at 120). The game specific remote services performs this computation by sending communications to the general marketplace remote services to identify any purchases the player has made. Once the game specific remote services have incorporated these purchases into the players account, it communicates to the general marketplace remote services to mark the each purchase as fulfilled. For this reason, the balances shown within the general marketplace are not cumulative, but only show purchases made that are pending transfer into the players account maintained by the game specific remote services.

2. Example Req Lifetime

In particular embodiments of the disclosed technology, when an instance of a Pack is obtained, it starts in an "unopened" state. Users may have multiple instances of one or more Packs in this "closed" or "unopened" state. Only when a specific instance is opened, is it then marked as "open", and the actual rewards within that Pack are determined and provided. Therefore, in this example, the "opening" process results in Reqs being selected and granted to the player. Notably, in certain embodiments, when the player open a Pack, a service request is transmitted to the remote server providing the remote services. The remote server then performs the process for selecting which Reqs are to be awarded for the Pack based on highly-customizable and adaptive rules and Req inventories. The results of this process can then be transmitted back to the requesting device and the awarded Reqs added to the player's available inventory of Reqs. This ability to select the awarded Reqs at the time of Pack opening instead of the time when the Pack is obtained allows for the Req selection process to be adaptive to factors associated with the current state of the player and/or other factors.

In certain embodiments, Reqs begin as unused. In particular implementations, the available Reqs may be categorized as durables and consumables. Durables typically do not leave this state. Consumables may be attached to a match for consumption when the match ends (e.g., Boost cards). The services may revert this action if it detects that the game host has crashed and the game will never finish. Otherwise, the Req will be marked as consumed at match end. Other consumable cards may be chosen by the user and granted by the game host while playing a match. The game host will consume the cards on the players behalf during the match. In certain embodiments, Reqs may also be "sellable" by players, where the player may choose to remove the item from their inventory in exchange for Credits that could be used towards future Req Pack purchases.

Figure 2:
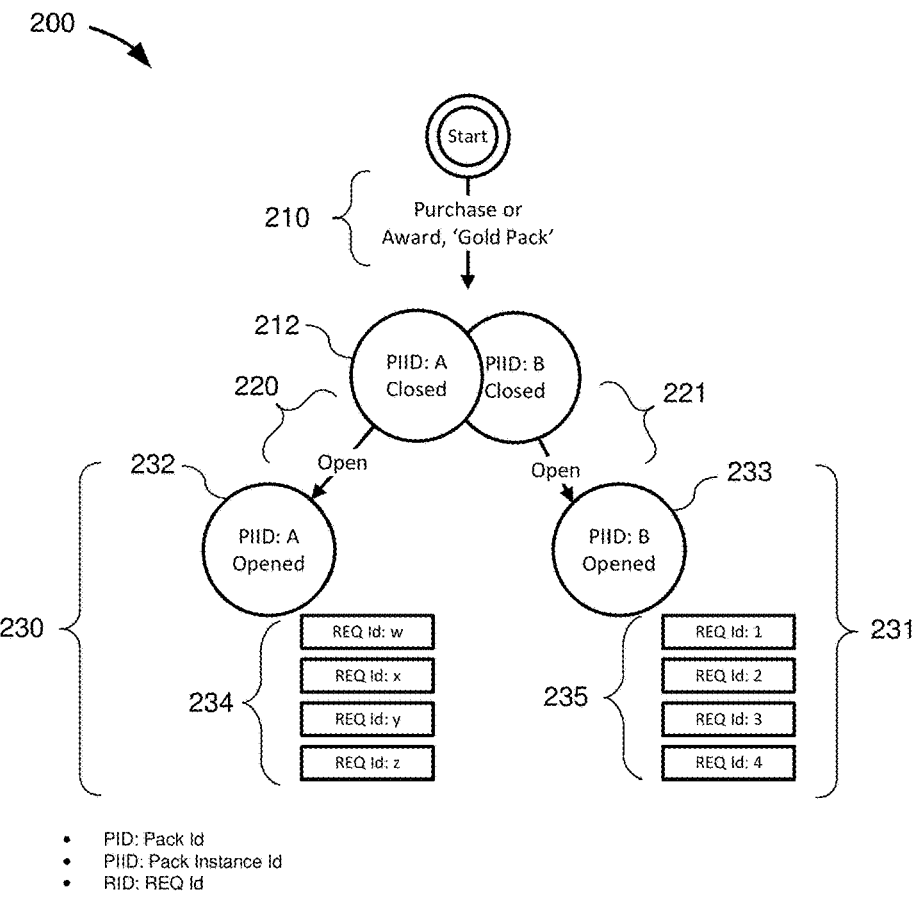
FIG. 2 is a schematic diagram illustrating an example process of a player purchasing or being awarded two or more digital reward packs, and then, at some later time, opening two of those packs, thus receiving digital rewards (Reqs).

FIG. 2 is a schematic diagram 200 illustrating an example process of a player purchasing or being awarded two packs (here, the so-called "Gold Pack"), and then, at some later time, opening each instance. At 210, the player purchases or is awarded two or more Gold Packs. The purchasing and/or awarding at 210 may occur at different times. As illustrated at 212, each instance of the pack is initially in a closed state. That is, it's contents have yet to be determined, thus allowing for the pack contents to be dynamically determined at a later time and be dependent, at least in part, on one or more factors that reflect a player's current state or that reflect data captured from a group of two or more players (e.g., the player population as a whole or some subset thereof). Player action 220 represents a player selecting a first of the unopened packs and selecting to "open" it (e.g., via a suitable graphic user interface and user input). After and responsive to the user's selection to open the pack, a reward determination process 230 can be performed. As noted, this reward determination may be performed by a centralized backend computing device (e.g., one or more cloud-based servers). As a result of the process 230, the unique pack instance 232 is updated with the unique pack contents 234 that result from the process 230. The unique pack contents 234 can then be shown to the user. FIG. 2 also shows another player action 221 that represents a player selecting a second instance of the unopened pack and selecting to "open" it (e.g., via a suitable graphic user interface and user input). After and responsive to the user's selection to open the second pack, a reward determination process 231 can be performed. As noted, this reward determination process may be performed by a centralized backend computing device (e.g., one or more cloud-based servers). As a result of the process 231, a second unique pack instance 233 is updated with the unique pack contents 235 that result from the process 231. The unique pack contents 235 can then be shown to the user.

Figure 3:
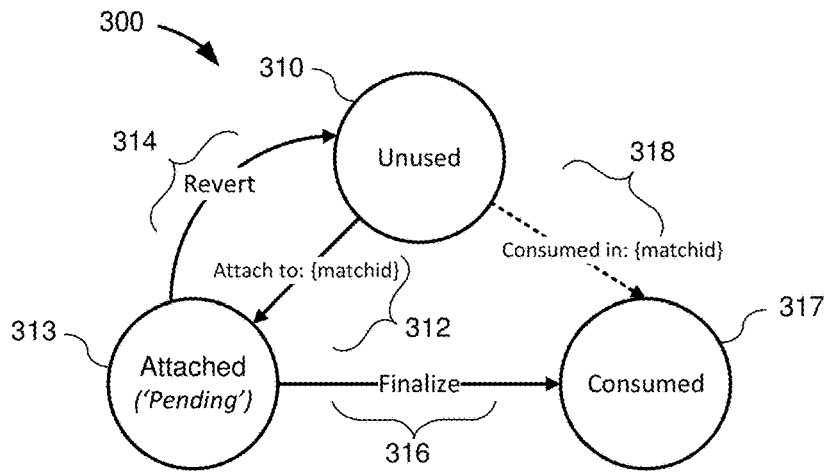
FIG. 3 is an example state diagram illustrating how some digital rewards (Reqs), now available to a player, may be consumed to achieve gameplay goals.

FIG. 3 is an example state diagram 300 illustrating how a Req now available to a player (e.g., through the process of opening a Req Pack, as in FIG. 2) can then be implemented. In this embodiment certain types of Reqs may "boost" the amount of Credits or XP awarded to the player (or team) when the match concludes. In these scenarios, the available Req 310 may be selected prior to a particular match (identified by a match ID). This process is illustrated at 312. Upon player selection, the Req is transformed into an "attached" state, as shown at 313, marking it for consideration when the match concludes and rewards are determined. However, if some event occurs during the match that compromises the integrity of the match (e.g., the game host crashes or some other technical event occurs that makes the match results not reliable), the Req can be reverted back to its unused state, as shown at 314. This reverting action can be performed by the game-specific remote services. If, however, the match completes reliability, then the Req can be converted to a consumed state 317 through a finalization process 316. This finalization process can be performed by the game-specific remote services and cause the player's inventory to be updated to reflect the consumption of the Req. In other embodiments, however, a Req selected by a player (either before or during match) is marked immediately, without the possibility for reversion, as illustrated by alternative 318.

3. Req Pack Modeling

In certain embodiments of the disclosed technology, to determine the contents of a Req Pack, a system of rules, weights, requirements and/or keywords is used. An example implementation of such a system is described below. This particular implementation is not to be construed as limiting, however, as the underlying principles can be readily adapted to a variety of reward systems.

a. Pool Model

A Req Pool can be reused across Req Packs. In general, the Pool is a set of rules that, when evaluated, will determine a single Req that should be provided to the player. To evaluate these rules, and in certain embodiments, two inputs are used—an optional keyword, and a list of the players unconsumed Reqs. Other embodiments use different inputs.

Figure 4:
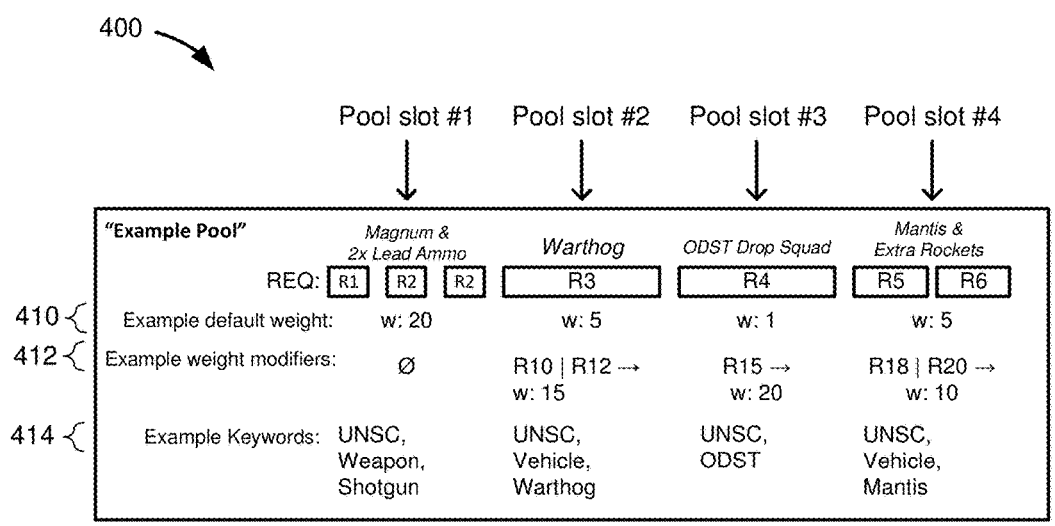
FIG. 4 is a schematic block diagram of an example digital reward pool (Req Pool) illustrating the flexibility and customization possibilities available with embodiments of the disclosed technology.

FIG. 4 is a schematic block diagram 400 of an example Req Pool illustrating the flexibility and customization possibilities available with embodiments of the disclosed technology. A Req Pool can comprise one or more "slots", each of which may then be populated with one or more respective Reqs. The slots, in turn, may be weighted to increase or decrease the likelihood of the Reqs in a particular slot being selected during a weighted random selection process. Furthermore, those weights can be dynamically altered in accordance with one or more rules, which can account for a variety of factors.

In FIG. 4, four pool slots are specified: Pool slot #1 (having Reqs R1, R2, and R3), Pool slot #2 (having Req R3); Pool slot #3 (having Req R4); and Pool slot #4 (having Req R5 and R6). When this example pool is evaluated, it will output one of the following options: Ø, (R1+R2+R2), R3, R4, or (R5+R6).

Again, pool "slots" are used to group together one or more Reqs, plus settings that will determine if the slot is selected. In particular embodiments, the slot is selected using a weighted random selection algorithm. Examples of such algorithms are described, for instance, at https://en.wikipedia.org/wiki/Fitness_proportionate_selection.

In one example embodiment, to determine the weight (or fitness) to use for each slot, one or more of the following steps are executed:

- If the Req Pack rule (see below) uses a keyword against this pool, the slot in the pool must also have this keyword.
  - Slots in the pool without the supplied keyword will have weight=0.
  - If all slots in the pool have weight=0, the pool will not return any Reqs.
- Slots in the pool have a default weight and an optional modifier.
  - By default, each slot will have a default weight specified.
  - If a modifier is specified, and the modifier rule evaluates to true, the modified weight is used instead.

Once the weights for all slots in the pool are determined, a slot is chosen randomly in accordance with the weight. The Reqs configured for that slot are the output of the pool evaluation.

b. Weight Modifiers:

In particular implementations, the weight modifier allows designers to adjust the likelihood that the slot will output based on what the user already has. For instance, in particular examples, the modified weight value will be used if the player currently has at least one unconsumed instance of any Req specified in the modifier. In some embodiments, only "OR" logic is supported. However, in other embodiments, any type of logic can be used to create the weight modifiers (AND, OR, both AND and OR, etc.). Still further, although the examples above show only two Reqs being part of the modifiers, the modifiers can be extended to involve any number of Reqs linked by any algebraic operators (e.g., X|Y|Z→w; X & Y & Z→w; (X|Y) & Z→w; X|(Y & Z)→w; and so on).

Returning to FIG. 4, example default weight for each of the pool slots are shown at 410. At 412, example weight modifiers are shown for the one or more available pool slots. The weight modifiers in this example are shown, for example purposes only, as relating to whether one or more other Reqs are previously held by a player (e.g., using "OR" logic). In the illustrated example: for pool slot #1, no weight modifier is applied; for pool slot #2, the weight for the pool slot is increased from 5 to 15 if the player has Req 10 or Req 12 in his inventory; for pool slot #3, the weight for the pool slot is increased from 1 to 20 if the player has Req 15 in his inventory, and for pool slot #4, the weight for the pool slot is increased from 5 to 10 if the player has Req 18 or Req 20 in his inventory.

At 414, example keywords for each pool slot are given. The keywords can be used by developers to label and subsequently identify pool slot possibilities (such as those shown in FIG. 4) for possible re-use or inclusion of the pool within other Req Pack rules.

Again, the number and/or content of the pool slots (as well as the corresponding weight modifiers) shown in FIG. 4 are by way of example only, as they can be flexibly modified to include any number of pool slots, any number of Reqs in each pool slot, any default weight, one or more weight modifiers (defining weight modification through one or more rules using a variety of algebraic relationships or combinations thereof), and/or one or more keywords).

c. Req Pack Rules

In accordance with certain example embodiments, the available one or more pools are referenced by "rules" within a Req Pack. Rules exist as a way for the reward system to first select a pool offered by the Req Pack, then the selected pool is evaluated to determine what Reqs will be granted or not. (In particular embodiments, the design team should avoid scenarios where a pool does not return a Req, although the possibility of no Req being rewarded is possible). Req Packs can therefore be defined as an ordered list of Rules. In addition to the rules, other metadata can exist to describe the Req Pack.

Figure 5:
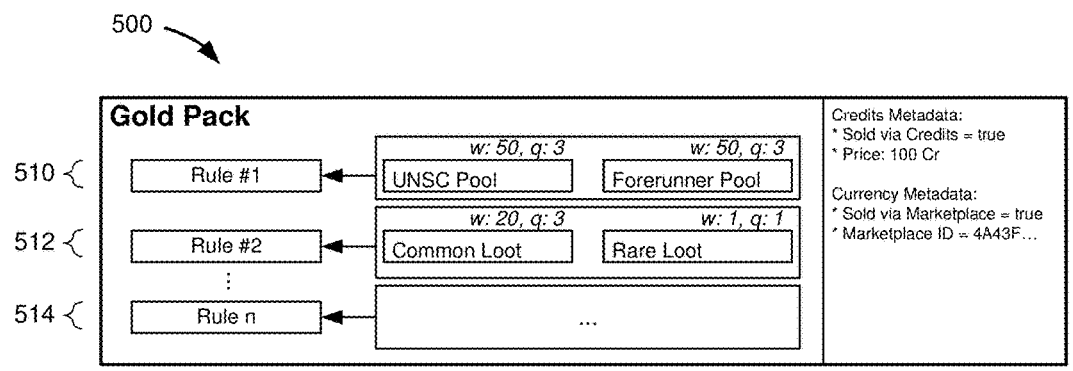
FIG. 5 is a schematic block diagram of an example digital reward pack.

FIG. 5 is a schematic block diagram 500 of an example Req Pack, labeled a "Gold Pack". In this particular example, the illustrated Gold Pack shows two rules with associated weights for selecting a pool to be used for an available reward within the pack. In other words, a particular Req Pack may be comprised of one or more rules, each rule being associated with selecting (according to a weighted selection procedure) a pool of possible Reqs. Once the pool is selected, a separate selection procedure as defined by the rules for that pool can be performed to select the one or more Reqs to be awarded from that pool.

In the illustrated embodiment, two rules (rule #1 at 510 and rule #2 at 512) are distinctly specified, but multiple additional rules may also be specified, as shown by rule n at 514.

In FIG. 5, an example "Gold Pack" Req Pack comprises two rules. According to Rule #1 (shown at 510), the "UNSC Pool" and "Forerunner Pool" both use weight 50, resulting in an equal probability of the pool being selected. Further, if either pool is selected, it is evaluated three times (as indicated by "q: 3") to produce three respective reward results from the selected pool. According to Rule #2 (shown at 512), the "Common Loot" pool is 20× more likely to be selected over the "Rare Loot" pool. If the "Common Loot" pool is selected, it is evaluated three times (as indicated by "q: 3").

Further, if the "Rare Loot" pool is selected, it is only executed once (as indicated by "q: 1") shown in FIG. 5.

In particular embodiments, the weight (w) and number of times of pool evaluation (q) are variable. This variability allows for flexibility in pool selection; moreover, the weight modifiers and the associated rules allow for flexibility in inter-pool selection of rewards.

In the example design, the order the rules are executed does not matter. Further, additional data on the Req Pack can, for example, define pricing and the marketplace product ids. For user interface purposes or client functionality, additional metadata may be included with the Req Pack.

Lastly, keywords can be specified to increase the reusability of pools.

Figure 6:
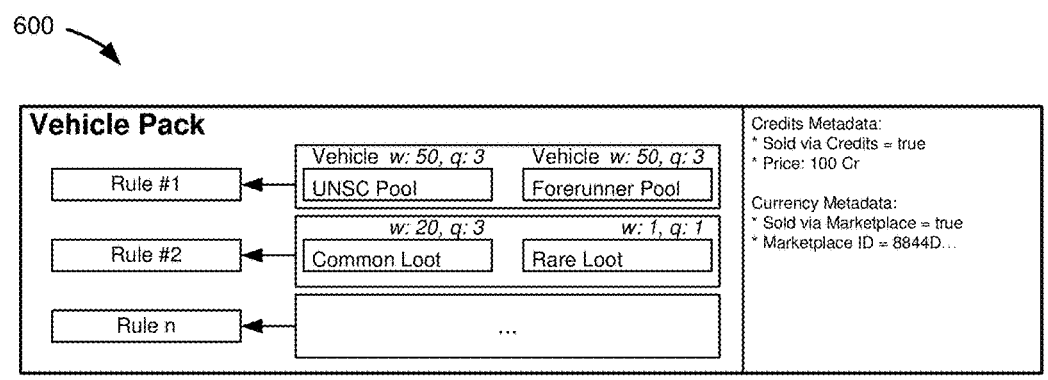
FIG. 6 is a schematic block diagram of another example digital reward pack.

FIG. 6 is a schematic block diagram 600 of an example Req Pack, labeled a "Vehicle Pack". In this particular example, the illustrated Vehicle Pack shows two rules with associated weights for selecting a pool to be used for an available reward within the pack. In other words, this particular Req Pack may be comprised of one or more rules, each rule being associated with selecting (according to a weighted selection procedure) a pool of possible Reqs—here oriented toward vehicles. The only difference between FIG. 5 and FIG. 6. is that the "Vehicle" keyword has been specified on the "UNSC Pool" and "Forerunner Pool". This keyword restricts what either pool may output. The selected pool will only output Req's that have the keyword "Vehicle". This allows the contents of the pack to have a common theme. In some embodiments, the supported keywords will be an enum, not free-form text so as to minimize matching errors. Once a pool is selected, a separate selection procedure as defined by the rules for that pool (e.g., using a Req Pool as described above with respect to FIG. 4) can be performed to select the one or more Reqs to be awarded from that pool—here vehicle Reqs.

In operation, then, and in accordance with certain example embodiments, when a player selects to "open" a Req Pack in their inventory, a first selection procedure is performed to determine which set of one or more pools should be evaluated for Req determination. For instance, the Req Pack framework described above with respect to FIG. 5 or FIG. 6 can be used. Then, a second selection procedure can be performed in which the actual Reqs for the selected pool or pools are selected. For instance, the Req Pool and weighted selection process as described above with respect to FIG. 4 can be used.

d. Miscellaneous Scenarios

Certain embodiments of the disclosed technology can support one or more of the following scenarios:

Scheduled Price Change.

In general, the flexibility of the disclosed technology allows for delayed publishing. This also allows a change to an existing Req Pack to be scheduled in the future. Designers can use this feature to enact a price change on a scheduled date and time.

Scheduled Availability Change.

Again, using delayed publishing, a Req Pack can be enabled/disabled for purchase on a future date. Designers can use this feature to introduce time limited packs, for example a "Halloween pack" can be scheduled to be available for sale on Oct-31.

F. Further System Functionality

This section focuses on scenarios in which service APIs between the application executing at the end user's device and the remote server providing remote services are used.

Example APIs are introduced below, any one or more of which can be used in implementations of the disclosed technology.

1. View & Open My Req Packs

Example embodiments of the disclosed technology allow a user to view all their closed packs. In particular implementations, the remote service may call the general marketplace (e.g., Xbox Live) to ensure that any packs purchased via Currency are integrated into the results.

Figure 7:
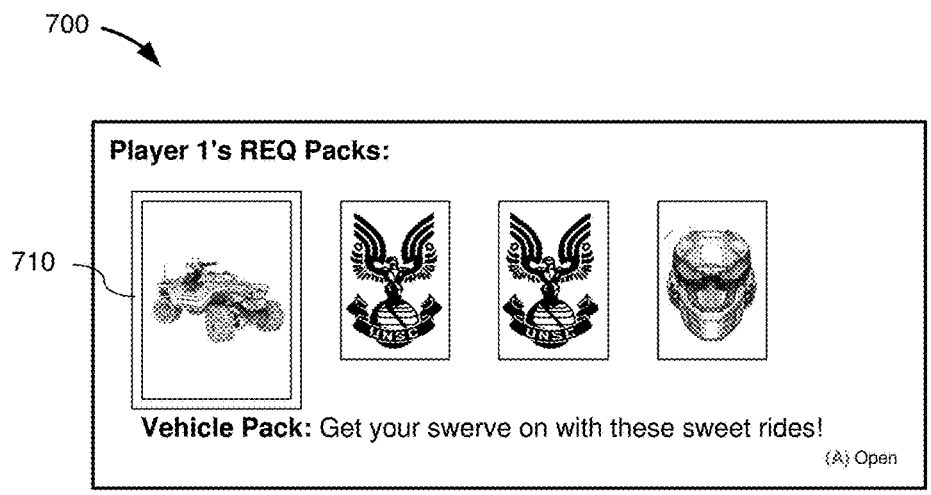
FIG. 7 is a schematic diagram showing one example interface displaying a player's available digital reward packs (Req Packs) and showing selection of a particular pack.

FIG. 7 is a schematic diagram 700 showing one example interface displaying a player's available Req Packs and showing selection of a particular Req Pack 710 (here, the Vehicle Pack). Here, the selected Req Pack is highlighted, enlarged, and a descriptive text is displayed. The player may then select to "open" the highlighted Req Pack, thus triggering the content selection process as described above. As noted, by delaying the content selection process until the selection by a player to open the pack and the use of a remote server to perform the selection greatly increases flexibility and customization in reward generation. Additionally, the use of a remote server helps reduce the computational and memory burden at the local client computing device executing the application (game).

In this example, the following APIs can be used to obtain the data from the remote services used to generate the interface:

Req API—Get packs for Player
CMS API—Get localized metadata for all packs.

A players can then select a pack and click to open. Once opened, the UI will show the player what Reqs they acquired.

Figure 8:
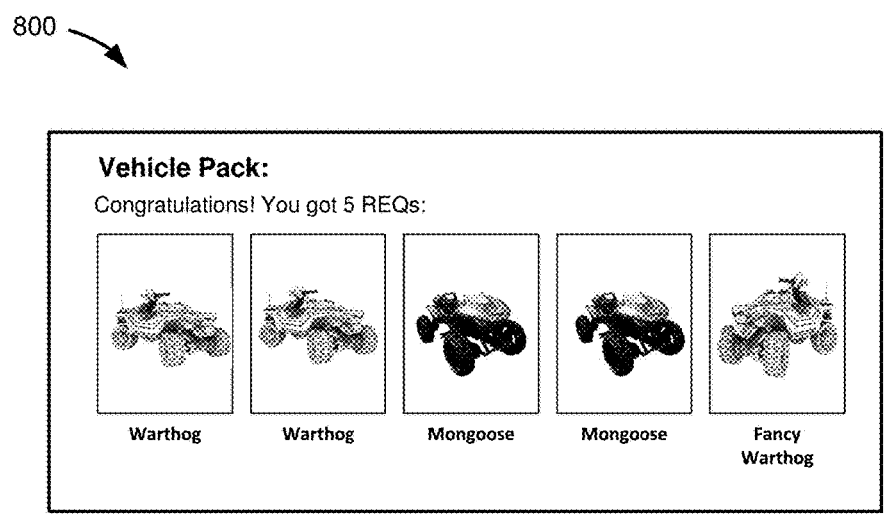
FIG. 8 is a schematic diagram showing one example interface for displaying to the player which digital rewards have been rewarded upon selecting to "open" a selected digital reward pack (Req Pack).

FIG. 8 is a schematic diagram 800 showing one example interface for displaying to the player which Reqs have been rewarded upon selecting to "open" a selected Req Pack. In the particular example, the Req Pack opened was a Vehicle Pack (as selected in FIG. 7).

The interface includes a series of images, text, and/or other data identifying the Reqs awarded. For instance, in this example, images and accompanying descriptive text are displayed for each Req.

In one example, the following APIs can be used to implement this functionality:

Req API—Patch Pack Instance for Player
CMS API—Get localized metadata for all Reqs.

2. Shop for Req Packs

Figure 9:
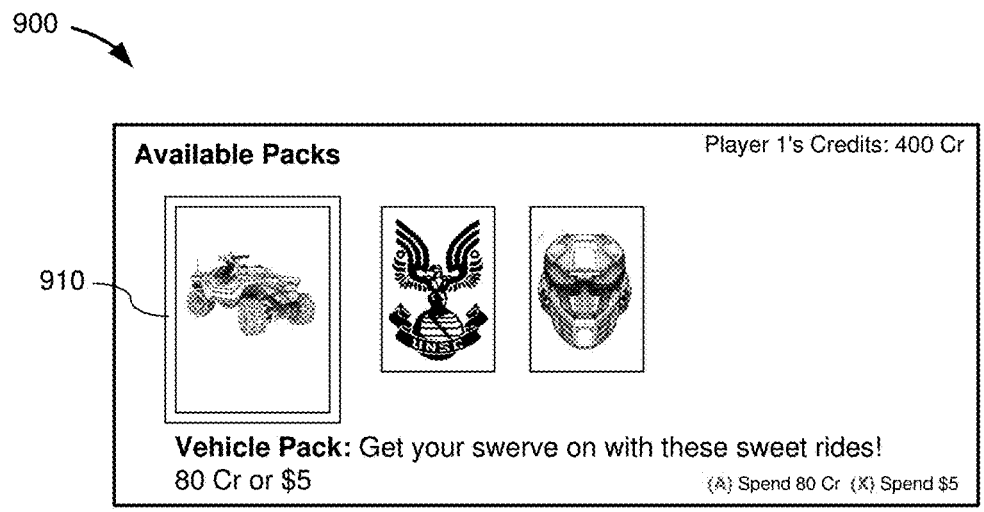
FIG. 9 is a schematic diagram showing one example interface for displaying to the player digital rewards (Reqs) available for purchase.

Example embodiments of the disclosed technology allow a user to purchase Req Packs using Credits and/or Currency. FIG. 9 is a schematic diagram 900 showing one example interface for displaying to the player Reqs available for purchase (using either Credits or Currency). In FIG. 9, a selected Req pack 910 is highlighted, enlarged, and accompanied by some explanatory text that also includes the price in Currency and in Credits. Also shown are the player's available credits.

In one example, the following APIs can be used to implement this functionality:

Req API—Get Reqs for sale.
Account API—Get Credit Balance
Xbox Live API—Get marketplace item pricing & availability details When purchasing with Currency, a marketplace dialog (e.g., Xbox Live) can be invoked. This dialog will confirm the price and usher the user through the transaction. When the user returns, the Req Pack inventory can be shown.

When purchasing with Credits, a confirmation dialog can be shown. This dialog will confirm the price and usher them through the transaction. When the user returns, the Req Pack inventory can be shown. If the Credit price is lowered between the time the user obtains the price and confirms the purchase, the user is charged the lower amount. If the Credit price is raised, the purchase is rejected so the user has the opportunity to review the new cost. If the pack is no longer available or the user doesn't have sufficient credits, the purchase is also rejected.

To complete the purchase with Credits and to post a Req Pack to the user's inventory, the following example API can be used:

Req API—Post Pack for Player

3. View My Reqs

Figure 10:
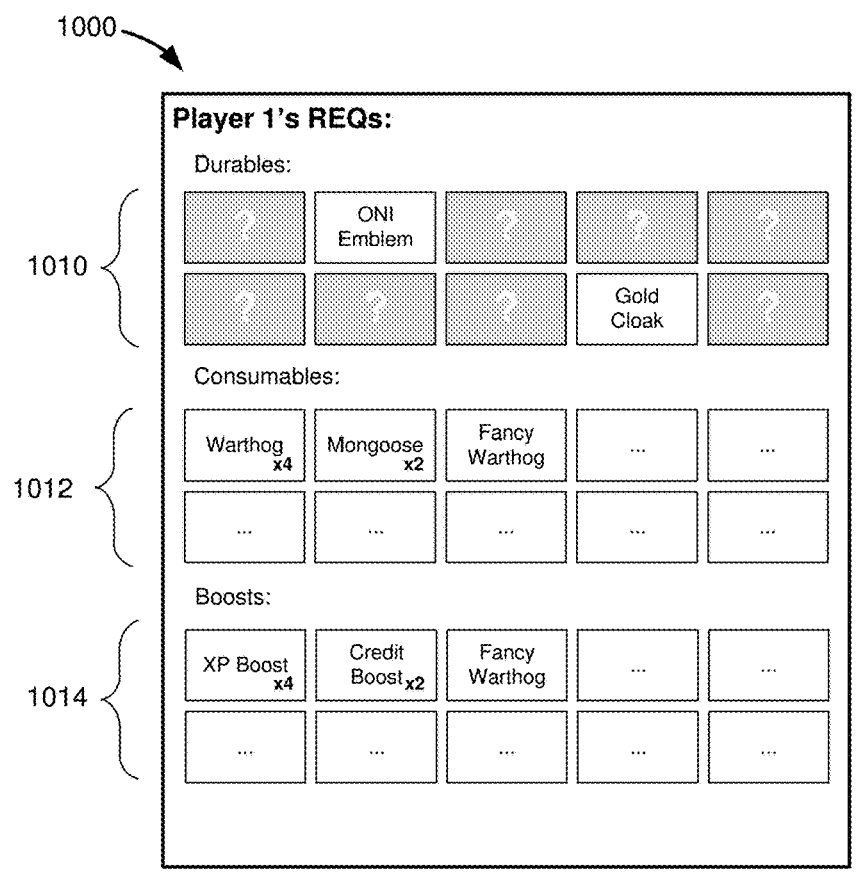
FIG. 10 is a schematic diagram showing one example interface for displaying to the player the available digital rewards in their inventory.

Users may want to view what Reqs they have collected (durables) and have (consumables). Metadata can be used to aid in the layout or to provide any filters/pivots that may be desired. FIG. 10 is a schematic diagram 1000 showing one example interface for displaying to the player the available digital rewards in their inventory. In FIG. 10, the available Reqs are categorized into Req types. In the illustrated example, the Req types are durables (shown at 1010), consumable (shown at 1012), and boosts (a specific type of consumable) (shown at 1014). Of course, the particular types of Reqs shown will vary depending on the implementation. Each Req may be shown by a graphic representing the Req. Further, when the user has multiple instances of the same Reqs, they can be individually shown or signaled by a multiplier (e.g., "×2", "×3", and so one).

In one example, the following APIs can be used to implement this functionality:

CMS API—Get Localized metadata for Reqs.

Req API—Get Reqs for Player

4. Use a Req in-Game

In particular embodiments, the game host is responsible for consuming Reqs in-game. The game host can be a server-based game host (e.g., a virtual machine that is implemented to host and arbitrate each multiplayer match) or be a local host (e.g., one or more of the computing devices operated by the end user). The game host can call the remote services (e.g., Halo Services) after it successfully allocates the Req item to the player. To ensure players do not call in Reqs they don't have, the game host can call the "Get Reqs for Player" API before items are used. Only items the player has should be allocated. Game rules may also control which Reqs are allowed in the match (e.g. vehicle ordinances may be disallowed on small maps).

Once the Req has been provided to the player in-game, the game host should call the "Patch Req Instance for Player" API. If the API call fails, a retry schedule can be used. If the schedule is exhausted (say the service is down) the Req will stay unconsumed in the service, and the player would be able to use it a second time.

5. Allocate a Rep Pre-Game

In addition to normal consumables, which may be consumed while in-match, "Boost" type Reqs are attached to matches, then finalized when the match ends. FIG. 3 above shows the process flow for one example embodiment in which a Req that is used "in match" is first attached to the match (suing a unique matchid) and then finalized upon match completion.

In some embodiments, when players enter the pre-match lobby, they have an opportunity to select and play boost cards. When a match begins, the users' choices are "locked in"—no further changes may be made.

As an example, the following scenarios illustrate what happens when Player 1 and Player 2 play Player Y and Player Z, and Player 1 plays a boost card.

| Scenario | Effect | Notes |
| --- | --- | --- |
| All players complete the match. | Match stats incorporate the boost. The card is consumed when the match ends. | Boost cards are defined with associated rules. |
| A player quits early. | The player is marked as ineligible for boost card rewards. Match stats incorporate the boost for all remaining players that are eligible per the rules specific to the boost card. The card is still consumed, even if no players remain eligible for rewards. | One must complete the match to earn the boost. |
| A player is disconnected (bad network) or is kicked out of the match (e.g. team killing) and is unable to reconnect to the match. | The player is marked as ineligible for boost card rewards. Match stats incorporate the boost for all remaining players that are eligible per the rules specific to the boost card. The card is still consumed, even if no players remain eligible for rewards. | |
| The game host crashes mid-game, and the game doesn't complete. | When the situation is detected, any boost cards attached to the match should be reverted and returned to players in an unconsumed state. | |
| Player 1 changes teams and joins Player Y + Player Z. | Match stats incorporate the boost for all players eligible per the rules specific to the boost card. The boost card rules will consider Player 1 to be a member of the team Player 1 had when joining the match, if the boost card rules evaluate team membership. | |

H. User Admin Functionality

Administrators (e.g., administrators for a tournament or event involving the underlying game) desirably have the ability to view the current Req Pack feature state for any player. The following sections outline example scenarios & APIs for providing such functionality.

1. View all Packs for a Player

FIG. 11 is a schematic diagram 1100 showing an example interface for viewing all packs currently held by a player. In this particular example, the following types of data are shown (though any one or more of the items may be shown, depending on the implementation): the id and localized name for each pack that exists (even those the user doesn't have); how many units of each pack the player has, both in closed state, and opened; and/or how many units of each state came via Credits, Currency, progression awards, and/or other means. In further embodiments, data showing when the service last successfully downloaded the players' general marketplace purchase data can displayed.

In this example, the administrator has the following further abilities: granting the user an instance of any pack (e.g., by clicking "grant"); and/or viewing further detail about the instances of that pack (e.g., by clicking the pack title).

In one example, the following APIs can be used to implement this functionality:

Req API—Get Packs for Player
CMS API—Get localized metadata for all packs.

2. View all Instances of a Pack

FIG. 12 is a schematic diagram 1200 showing an example interface for viewing all instances of a particular pack. In this particular example, the following types of data are shown (though any one or more of the items may be shown, depending on the implementation): the id and localized name for the pack that is being shown in detail; an indication of when the service last successfully downloaded the players' purchases from Xbox Live and what the balance is; and/or the pack instance history. For each instance of a pack, administrators may review one or more of the following: the instance id; the current instance state; the instance source ('Credits', 'Currency', 'Progression', or 'Other'); when the instance was acquired; the "reason" logged when the instance was acquired; and/or when the instance was opened (if it was opened).

In this example, the administrator has the following further abilities: viewing the Reqs that were granted when an opened instance was opened (click the instance id); and/or sorting the pack instance history by any column to make it easier to review.

In one example, the following APIs can be used to implement this functionality:

Req API—Get Pack Instances for Player (by Pack Id)
CMS API—Get localized metadata for Pack.

3. View all Reps for a Pack Instance

FIG. 13 is a schematic diagram 1300 showing an example interface for viewing a specific instance of a particular pack. In this particular example, the following types of data are shown (though any one or more of the items may be shown, depending on the implementation): pack instance data, such as one or more of: state, source, acquisition date+reason; and/or opened date (if opened); and/or if the pack was opened, show the Reqs provided (including in some embodiments, for each, one or more of: Id; name; type (durable vs. consumable); if consumable, has it been consumed?; what date was it consumed?; and/or what match id was it consumed in?

In this example, the administrator has the ability to click the match id to view details of that match.

In one example, the following APIs can be used to implement this functionality:

Req API—Get Details for Pack Instance
CMS API—Get localized metadata for Pack
CMS API—Get localized metadata for Req
Stats API—Get statistics for match 4. View all Reps for a Player FIG. 14 is a schematic diagram 1400 showing an example interface for viewing all Reqs acquired and consumed by a player. In this particular example, all Req instances Player 1 currently has (or previously had) are shown. The table can have one or more of the following columns: Req instance Id; Pack instance Id (if the Req instance came from a pack); Pack name (if the Req instance came from a pack); Req name; Req type (e.g., durable or consumable); acquisition date; acquisition reason; if the Req is a consumable, the consumable status; if the Req has been consumed, the consumed date; and/or if the Req has been consumed, the match id where consumed.

In this example, the administrator has the ability to: click the Req Pack instance Id to view the Req Pack instance data; and/or click the match id to view the match details.

Figure 15:
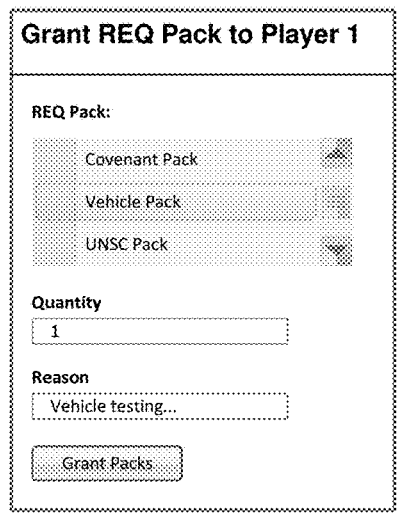
FIG. 15 is a schematic diagram showing an example interface for granting a pack to a user.

In one example, the following APIs can be used to implement this functionality:

Req API—Get Reqs for Player
CMS API—Get localized metadata for Pack
CMS API—Get localized metadata for Req
Stats API—Get statistics for match 5. Grant a Pack to a User FIG. 15 is a schematic diagram 1500 showing an example interface for granting a pack to a user. In this particular example, the following types of data are shown (though any one or more of the items may be shown, depending on the implementation): the available Req Packs, the quantity to be granted, and/or a reason for the grant.

In this example, the administrator has the ability to: select a Pack to grant; enter a quantity to grant; enter a reason that will be logged, explaining why the grant is taking place;

The administrator can then submit the grant, which will validate a Pack has been selected, a quantity has been entered in the range [1, 343], and the reason is not empty or all whitespace. When successful, the admin can be shown the updated instance list for the Pack granted.

In one example, the following APIs can be used to implement this functionality:

Req API—Post Pack for Player
CMS API—Get localized metadata for Pack

6. Grant a Req to a Player

Figure 16:
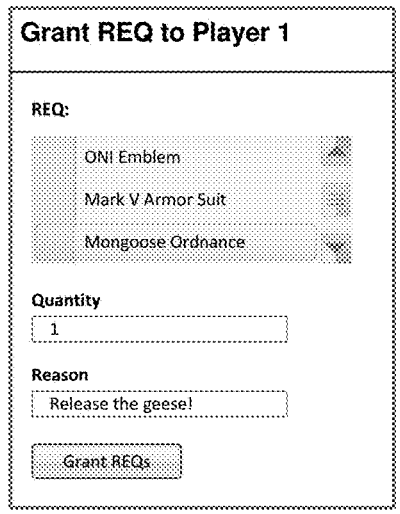
FIG. 16 is a schematic diagram showing an example interface for granting a Req to a player.

FIG. 16 is a schematic diagram 1600 showing an example interface for granting a Req to a player. In this particular example, the following types of data are shown (though any one or more of the items may be shown, depending on the implementation): the available Reqs, the quantity to be granted, and/or a reason for the grant.

In this example, the administrator has the ability to: select a Req to grant; enter a quantity to grant; enter a reason that will be logged, explaining why the grant is taking place; and/or submit the grant, which will validate a Req has been selected, a quantity has been entered in the range [1, 343], and the reason is not empty or all whitespace. When successful, the administrator is shown the updated Req instance list the player has.

In one example, the following APIs can be used to implement this functionality:

Req API—Post Req for Player
CMS API—Get localized metadata for Pack

7. Delete Reg Pack Instance

In some examples, administrators should be able to delete any Req Pack instance for any user. Once deleted, the pack no longer appears in the admin site, nor will it appear to users. No comment is collected, the item is simply deleted.

In one example, the following APIs can be used to implement this functionality:

Req API—Delete Req Pack Instance for Player (by Id)

I. Req APIs

In the table below, example APIs are shown, any one or more of which (or equivalents thereof) can be implemented in example embodiments of the disclosed technology. The APIs can be used by a game host (e.g., a remote server executing a virtual machine that is instantiated for a particular match, or a local game host) to communicate with a backend computing device (e.g., one or more cloud-based servers implementing the game specific remote services) and to thereby facilitate the digital reward system in accordance with embodiments of the disclosed technology:

| API | Method | URI | Description |
|---|---|---|---|
| Pack APIs | | | |
| List Packs for Player | GET | /{gameid}/players/{player}/packs | Get a list of all Packs for a player |
| List Pack Instances for Player | GET | /{gameid}/players{/player}/packs/{packType} | Get a list of all instances for a specific Pack. |
| Create Pack Instance for Player | POST | /{gameid}/players/{player}/packs/{packType} | Add an instances of the specified Pack. |
| Get Pack Instances for Player | GET | /{gameid}/players/{player}/packs/{packType}/{packInstance} | Get details on a specific Pack instance. |
| Update Pack Instance for Player | PATCH | /{gameid}/players/{player}/packs/{packType}/{packInstance} | Open a specific Pack instance. |
| Card APIs | | | |
| List Cards for Player | GET | /{gameid}/players/{player}/cards | List all Cards that a player has received. |
| List Card Instances for Player | GET | /{gameid}/players/{player}/cards/{cardType} | Get a list of instances of a specific Card a player has. |
| Create Card Instance for Player | POST | /{gameid}/players/{player}/cards/{cardType} | Grant an instance of the specified Card. |
| Update Card Instance for Player | PATCH | /{gameid}/players/{player}/cards/{cardType}/{cardInstance} | Modify (e.g. consume) a specific instance of a Card. |

In the examples below, the specific URIs provided are by way of example only, but not intended to be limited, as they may be adapted for any particular application.

1. Get Packs for Player (List)

This example API, enumerates all packs a player has:

| Method | URI |
|---|---|
| GET | /{gameid}/players/{player}/packs |

In particular embodiments (and in accordance with the example introduced above with respect to FIG. 1), the API will do the following:

Call the general marketplace remote service (e.g., Xbox Live) to determine if the user has any units of Req Pack products.

If the marketplace remote service (e.g., Xbox Live) product has >0 units for the player, the balance will be transferred to the game specific remote services (e.g., Halo Services). For each product:

Deduct the total # of units the general marketplace remote service (e.g., Xbox Live) reported, creating an instance of each Pack for each unit transferred; and/or If the transfer succeeds, update the LastMarketplaceTransferDateUtc for the corresponding Req Pack.

The API desirably supports paging to allow callers to iterate through the packs in order to support a large quantity of packs. The max-page-size limit is desirably sufficiently high so that the caller will not likely need to page.

To support admin scenarios, the API can support a query string parameter that instructs it to return packs with both closed and open instances.

In some examples, the API does not provide rich detail on each pack instance, but will list each instance, with id+state. This will keep the size of the response small and overall performance in check.

2. Get Pack Instances for Player (List)

This example API enumerates all instances of a specific pack that a player has:

| Method | URI |
|---|---|
| GET | /{gameid}/players/{player}/packs/{packType} |

The API may support paging to allow callers to iterate through the pack instances.

In some embodiments, the API will not provide detail on each pack instance, but will summarize the state of each, including the source, when it was acquired (and how) and when it was opened. For Packs that are also purchasable with Currency, the date the balance was last checked with the marketplace remote service (e.g., Xbox Live) and the date a non-zero balance was transferred from that marketplace remote service are also reported.

3. Get Pack Instance for Player (by Id)

This example API enumerates all details on a specific instance of a pack that a player has:

| Method | URI |
|---|---|
| GET | /{gameid}/players/{player}/packs/{packsType}/{packInstance} |

This API can return details about how this Pack instance was obtained, if it's "opened" or "closed", and what Req instances were granted if opened. For each Req instance, a summary of its current state is included.

4. Get Cards for Player (List)

Enumerates all Reqs that a player has:

| Method | URI |
|---|---|
| GET | /{gameid}/players/{player}/cards |

The API can support paging to allow callers to iterate through the Reqs.

To support admin scenarios, the API can support a filter restricting the output to either "unconsumed" or "consumed" or "all" Req instances. When omitted, only "unconsumed" Req instances are returned by default, which is what the game host may use. A filter will also be available to only return consumables or durables or both.

5. Get Card Instances for Player (List)

Enumerates all Req instances for a specific Req id, which a player has:

| Method | URI |
| --- | --- |
| GET | /{gameid}/players/{player}/cards/{cardType} |

The API can support paging to allow callers to iterate through the Reqs instances.

6. Post Pack Instance for Player

Allows one instance of a Pack be added to a players' Req Pack inventory:

| Method | URI |
| --- | --- |
| POST | /{gameid}/players/{player}/packs/{packType} |

The request body can allow the caller to specify an acquisition type ("Credits", "Progression", "Other"), a reason, and optional expected price (for purchase with Credits scenarios). Additionally, the desired target state may be specified in case the pack is to be immediately opened. In particular embodiments, when purchasing with Credits, if the actual price is less than or equal to the expected price, the player is charged the actual price; if the actual price is higher than the expected price, the purchase is not completed and the API responds with an error. A tracking id can be used to ensure the call is idempotent (so users don't double-purchase).

In error scenarios, the response body can clarify what scenario was hit so the client may message appropriately.

The response body can report the state of the newly created pack. If the client asked that it be created in 'Opened' state, the Req instances it provided are also included.

7. Post Card Instance for Player

Allows one or more instances of a Req be added to a players' Req inventory:

| Method | URI |
| --- | --- |
| POST | /{gameid}/players/{player}/cards/{cardType} |

The request body can allow the caller to include a reason. A tracking id can be used to ensure the call is idempotent.

The response body can contain the current state of the new Req instance.

8. Patch Pack Instance for Player

Allows a pack to be modified—the game host can use this API to "open" a pack:

| Method | URI |
| --- | --- |
| PATCH | /{gameid}/players/{player}/packs/{packType}/{packInstance} |

The request body can allow the caller to modify the state of the Pack instance, although only the transition from "Closed" to "Opened" may be allowed. A reason for the transition is collected for audit logging. A tracking id is used to ensure the call is idempotent.

If opening the pack granted the user any durable Req instances, the corresponding item will be enabled in their player profile.

The response body contains the updated state of the instance, which now includes the ids of the Reqs it provided.

Note: This API can also have logging and alerting around the rules that were used to determine the pack contents. The number of Reqs produced by each iteration of a pool and each rule should be logged (including this Req Pack instance id). Designers would like to review these logs periodically to determine if a pool or rule is outputting too much or too little.

9. Patch Card Instance for Player (by Id)

This API allows a Req instance to be modified. For example, the game host can use this API to "consume" a consumable Req instance.

| Method | URI |
| --- | --- |
| PATCH | /{gameid}/players/{player}/cards/{cardType}/{cardInstance} |

The request body can allow the caller to modify the Req instance state. In some examples, instances may be only modified from "Unconsumed" to "Consumed" (or "attached"). A tracking id can be used to ensure the call is idempotent. In the event the instance is already consumed, an error is returned to the client.

The response body can contain the updated state of the instance.

V. Example General Embodiments

Figure 17:
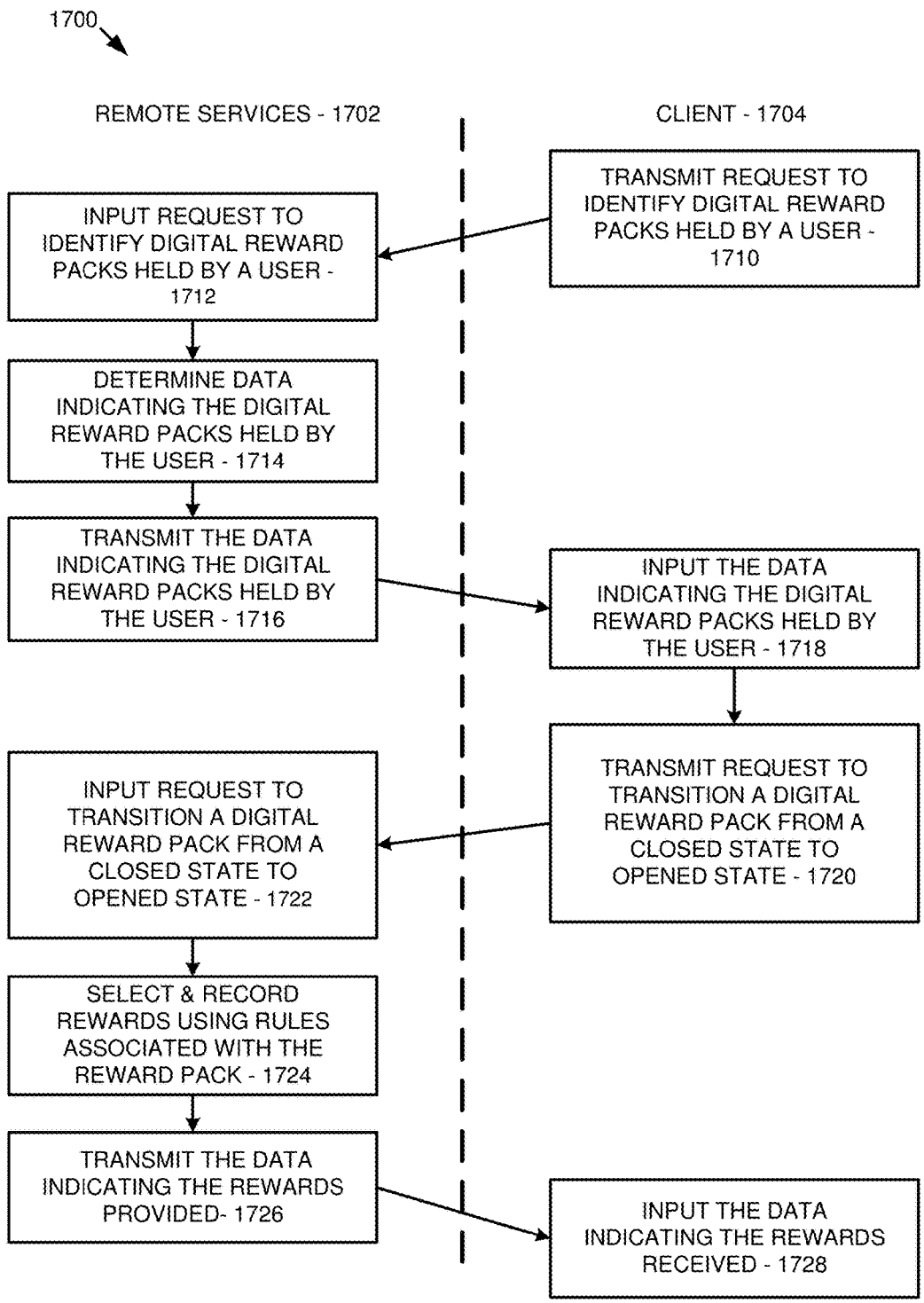
FIG. 17 is a flow chart showing one example method for implementing a digital rewards system in accordance with embodiments of the disclosed technology.

FIG. 17 is a flow chart 1700 showing one example method for implementing a digital rewards system in accordance with embodiments of the disclosed technology. In FIG. 17, the method is performed by a remote services computing device 1702 (e.g., one or more cloud-based servers) for a client computing device 1704. In certain embodiments, the client computing device 1704 can be a game host. The game host can be a neutral computing device (e.g., a cloud-based server that serves as a central game host/arbiter for a multi-user environment (e.g., a gaming application). Such a game host can be implemented as a virtual machine that receives input from further remote computing devices, such as the PC, gaming console, mobile device, or device operated by the users. Alternatively, the game host can be a computing device directly controlled by a user (such as a user's PC, gaming console, mobile device, or the like).

The remote services computing device 1702 can communicate with the client computing device 1704 via the internet or other network. Although FIG. 17 shows a distributed implementation, the method can also be performed at a single computer as part of a digital reward system implemented at the single computer (e.g., as part of a stand-alone program executing at the computer). Further, any of the disclosed methods or method acts can be performed with any other methods or method acts disclosed herein.

At 1710, data indicating a request to identify digital reward packs held by a user is transmitted by the client computing device 1704.

At 1712, the data indicating the request to identify digital reward packs held by a user is inputted.

At 1714, data indicating the digital reward packs held by the user, including data indicating a state of the digital reward packs, is determined. This process can include, for instance, reconciling digital reward packs provided by a non-game-specific marketplace with rewards purchased or earned via a game-specific interface.

At 1716, the data indicating the digital reward packs held by the user, including data indicating a state of the digital reward packs, is transmitted (e.g., back to the client computing device 1704).

At 1718, the data indicating the digital reward packs held by the user is received by the client computing device 1704. The client computing device 1704 can display or otherwise process this data as desired.

At 1720, data indicating a request to transition a digital reward pack from a closed state to an open state is transmitted from the client computing device 1704.

At 1722, the data indicating the request to transition a digital reward pack from a closed state to an open state is input by computing device(s) for remote services 1702.

At 1724, a reward from among two or more possible rewards is selected. This selection process can comprise using a weighted selection process in which a weight assigned to one or more of the possible rewards is dynamically determined in accordance with a set of one or more weighting rules that are applied after the data indicating the request is received. As explained elsewhere herein, selecting the reward at the time of a user opting to "open" a particular reward or reward package creates numerous customization possibilities and/or technical advantages that are not otherwise possible. In particular implementations, the selecting the reward can comprise: for each rule associated with the digital reward pack, in a first selection procedure, selecting one reward pool from among multiple reward pools using a first weighted random selection process; and in a second selection procedure, selecting one or more rewards from the selected reward pool using a second weighted random selection process in which the weight assigned to one or more of the possible reward slots is dynamically determined in accordance with the set of one or more weighting rules.

In certain embodiments, the act of determining the respective reward for each of the one or more reward slots comprises: adjusting odds of being awarded one or more of the multiple available rewards; and randomly selecting the respective reward from the multiple available rewards according to the adjusted odds. For instance, the adjusting the odds can be based, at least in part, on a current state of or inventory held by the user, or on data obtained from applying machine learning algorithms to multiple other users.

At 1726, the data indicating the digital rewards is transmitted (e.g., back to the client computing device 1704).

At 1728, the data indicating the digital rewards granted to the user is received by the client computing device 1704. The client computing device 1704 can display or otherwise process this data as desired.

As noted, in some embodiments, the request to transition the digital reward from a closed state to an open state can be transmitted by a client computer that is remote from the computing device 1702.

In certain embodiments, the request to transition the digital reward pack is initiated by a user, and the one or more of the weighting rules alter a likelihood that a respective one of the possible rewards will be awarded based at least in part on a current state of the user. In further embodiments, one or more of the weighting rules alter a likelihood that a respective one of the possible rewards will be awarded based at least in part on rewards that have already been awarded to the user. In still further embodiments, the method comprises dynamically altering the weighting rules based at least in part on gameplay characteristics of two or more other users different from the current user (e.g., a population of two or more players).

In further embodiments, the dynamic digital rewards system is programmed to adaptively alter reward-selection likelihoods based at least in part on a current state of a player being awarded a reward. In further embodiments, the dynamic digital rewards system is programmed to adaptively alter reward-selection likelihoods based at least in part on data obtained from the current state of other players, or from multiple remote clients. In still further embodiments, the method further comprises updating the two or more possible rewards to include a reward that was unavailable at the time the digital reward pack was obtained.

Figure 18:
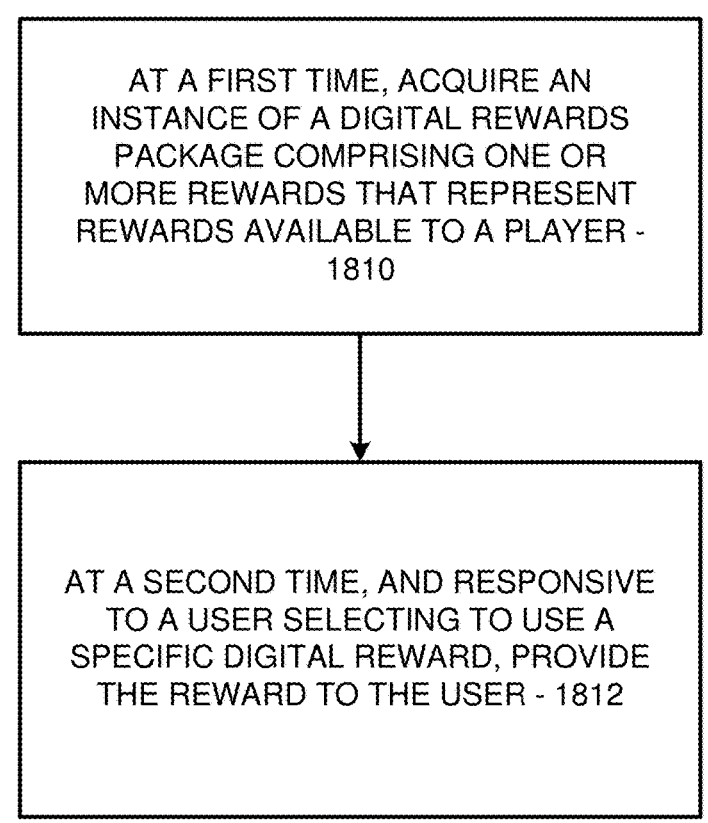
FIG. 18 is a flow chart showing another example method for implementing a digital rewards system in accordance with embodiments of the disclosed technology.

FIG. 18 is a flow chart 1800 showing another example method for implementing a digital rewards system in accordance with embodiments of the disclosed technology. In FIG. 18, the method is performed by a client computing device in communication with a remote services computing device (e.g., one or more cloud-based servers). In certain embodiments, the client computing device can be a game host. The game host can be a neutral computing device (e.g., a cloud-based server that serves as a central game host/arbiter for a multi-user environment (e.g., a gaming application)). Such a game host can be implemented as a virtual machine that receives input from further remote computing devices, such as the PC, gaming console, mobile device, or device operated by the users. Alternatively, the game host can be a computing device directly controlled by a user (such as a user's PC, gaming console, mobile device, or the like).

At 1810, at a first time, an instance of a digital rewards package comprising one or more rewards that represent available rewards for a user is acquired. For instance, this can be performed by transmitting a request to a remote central server for the remote central server to enumerate instances of a digital rewards currently held by a user; and receiving data enumerating instances of a digital rewards currently held by a user from the remote central server.

At 1812, at a second time, and responsive to a user selecting to use a specific digital reward instance, a specific digital reward is provided to the user and an update is transmitted to a remote central server for the remote central server to mark the reward as consumed.

A further embodiment disclosed herein comprises a system, comprising: a memory or storage device; and one or more processors, the one or more processors being configured to implement a dynamic digital rewards system that (a) supports one or more remote clients and thereby reduces memory overhead, processing overhead, or both at the one or more remote clients, and (b) provides digital rewards according to a rewards framework that is modifiable without updating executable code stored at the one or more remote clients.

VI. Example Computing Environments

Figure 19:
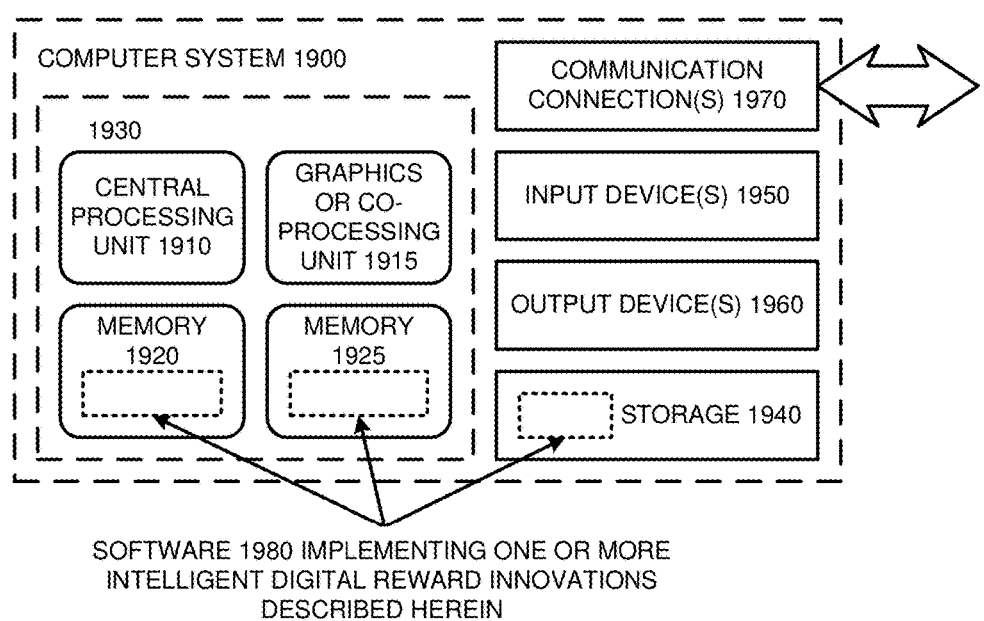
FIG. 19 illustrates a generalized example of a suitable computer system in which the described innovations may be implemented.

FIG. 19 illustrates a generalized example of a suitable computer system 1900 in which the described innovations may be implemented. The example computer system 1900 can be, for example, a computer system that is part of a server (e.g., a single server or a cloud-based server) programmed to provide remote services to a client computer in support of an application running at client computer. For instance, the server may be a server programmed to receive service calls from the client computer (e.g., requests related to Req or Req packs being collected, opened, used, purchased, etc.) by the user during a game or other execution of a application. The example computer system 1900 can also be part of a client system that is connected to the server (e.g., via the internet, LAN, WAN, or other connection) and that communicates via a suitable protocol (e.g., HTTP, HTTPs, or other appropriate protocol). The client system can be, for example, a computing system operating as a game host (e.g., another cloud-based server that serves as a central game host/arbiter for a multi-user environment (e.g., implemented using on-demand virtual machines), a computing system executing an application (e.g., a game in which digital rewards as disclosed herein are supported), a gaming console executing an application (e.g., a game in which digital rewards as disclosed herein are supported), or any other computing system executing an application in which digital rewards as disclosed herein are supported.

The example computer system 1900 can alternatively be part of a computing system (e.g., a gaming system) that performs the disclosed methods in a stand-alone fashion (e.g., as part of a dedicated software program having a digital reward system that uses any one or more features of the example embodiments disclosed herein). The computer system 1900 is not intended to suggest any limitation as to scope of use or functionality, as the innovations may be implemented in diverse general-purpose or special-purpose computer systems.

With reference to FIG. 19, the computer system 1900 includes one or more processing devices 1910, 1915 and memory 1920, 1925. The processing devices 1910, 1915 execute computer-executable instructions. A processing device can be a general-purpose CPU, GPU, processor in an ASIC, FPGA, or any other type of processor. In a multi-processing system, multiple processing units execute computer-executable instructions to increase processing power. For example, FIG. 19 shows a CPU 1910 as well as a GPU or co-processing unit 1915. The tangible memory 1920, 1925) may be volatile memory (e.g., registers, cache, RAM), non-volatile memory (e.g., ROM, EEPROM, flash memory, NVRAM, etc.), or some combination of the two, accessible by the processing device(s). The memory 1920, 1925 stores software 1980 implementing one or more innovations described herein, in the form of computer-executable instructions suitable for execution by the processing device(s).

A computer system may have additional features. For example, the computer system 1900 includes storage 1940, one or more input devices 1950, one or more output devices 1960, and one or more communication connections 1970. An interconnection mechanism (not shown) such as a bus, controller, or network interconnects the components of the computer system 1900. Typically, operating system software (not shown) provides an operating environment for other software executing in the computer system 1900, and coordinates activities of the components of the computer system 1900.

The tangible storage 1940 may be removable or non-removable, and includes magnetic disks, magnetic tapes or cassettes, optical storage media such as CD-ROMs or DVDs, or any other medium which can be used to store information and which can be accessed within the computer system 1900. The storage 1940 stores instructions for the software 1980 implementing one or more innovations described herein.

The input device(s) 1950 may be a touch input device such as a keyboard, mouse, game controller, pen, or trackball, a voice input device, a scanning device, or another device that provides input to the computer system 1900. For video or image input, the input device(s) 1950 may be a camera, video card, TV tuner card, screen capture module, or similar device that accepts video input in analog or digital form, or a CD-ROM or CD-RW that reads video input into the computer system 1900. The output device(s) 1960 include a display device. The output device(s) may also include a printer, speaker, CD-writer, or another device that provides output from the computer system 1900.

The communication connection(s) 1970 enable communication over a communication medium to another computing entity. For example, the communication connection(s) 1970 can connect the computer system 1900 to the internet and communicate with a remote server providing support services according to the functionality described herein. The communication medium conveys information such as computer-executable instructions, audio or video input or output, image data, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations presented herein can be described in the general context of computer-readable media. Computer-readable media are any available tangible media that can be accessed within a computing environment. By way of example, and not limitation, with the computer system 1900, computer-readable media include memory 1920, 1925, storage 1940, and combinations of any of the above. As used herein, the term computer-readable media does not cover, encompass, or otherwise include carrier waves or signals per se.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a GPU, or a programmable logic device ("PLD") such as a field programmable gate array ("FPGA")) specially designed or configured to implement any of the disclosed methods.

VII. Concluding Remarks

In view of the many possible embodiments to which the principles of the disclosed invention may be applied, it should be recognized that the illustrated embodiments are only preferred examples of the invention and should not be taken as limiting the scope of the invention.

What is claimed is:

1. A computer-implemented method, comprising:
by a server implementing a dynamic digital rewards system and comprising one or more memory or storage devices and one or more processors:
inputting data indicating a request to transition a digital reward pack from a closed state to an open state;
selecting a reward for the digital reward pack from among two or more possible rewards using a weighted selection process in which a weight assigned to one or more of the possible rewards is dynamically determined in accordance with a set of one or more weighting rules that are applied after the data indicating the request is received; and
outputting data indicating the reward selected.

2. The method of claim 1, wherein the request is transmitted by a client computer, and wherein the one or more memory or storage devices and the one or more processors are located in a cloud computing system located remotely from the client computer.

3. The method of claim 2, wherein the client computer is a server configured to operate as a game host for facilitating the acquisition of the digital reward pack.

4. The method of claim 1, wherein the request is initiated by a user, and wherein one or more of the weighting rules alter a likelihood that a respective one of the possible rewards will be awarded based at least in part on a current state of the user.

5. The method of claim 1, wherein the request is initiated by a user, and wherein one or more of the weighting rules alter a likelihood that a respective one of the possible rewards will be awarded based at least in part on rewards that have already been awarded to the user.

6. The method of claim 1, wherein the request is initiated by a current user, and wherein the method further comprises dynamically altering the weighting rules based at least in part on gameplay characteristics of two or more other users different from the current user.

7. The method of claim 1, wherein the request is initiated by a current user, and wherein the method further comprises updating the two or more possible rewards to include a reward that was unavailable at the time the digital reward pack was obtained.

8. The method of claim 1, wherein the selecting the reward comprises:
in a first selection procedure, selecting one reward pool from among multiple reward pools using a first weighted random selection process; and
in a second selection procedure, selecting one or more rewards from the selected reward pool using a second weighted random selection process in which the weight assigned to one or more of the possible rewards is dynamically determined in accordance with the set of one or more weighting rules.

9. The method of claim 1, further comprising:
inputting data indicating a request to identify digital reward packs held by a user; and
outputting data indicating the digital reward packs held by the user, including data indicating a state of the digital reward packs.

10. The method of claim 9, further comprising:
determining the digital reward packs held by the user by reconciling digital reward packs provided by a non-game-specific marketplace with reward packs purchased or earned via a game-specific interface.

11. One or more memory or storage devices storing computer-executable instructions which when executed cause the computer to perform a method, comprising:
at a first time, acquiring an instance of a digital rewards package comprising one or more reward rules that represent a reward to be granted; and
at a second time, and responsive to a user selecting to reveal contents of the instance of the digital rewards package, determining respective rewards for each of the one or more reward rules,
randomly selecting the reward from multiple available rewards, the selected reward being a reward that was not created until a time after the first time.

12. The one or more memory or storage devices of claim 11, wherein the determining comprises:
transmitting a request to a remote central server for the remote central server to determine the respective reward; and
receiving data indicating the respective reward for each of the one or more reward rules from the remote central server.

13. The one or more memory or storage devices of claim 11, wherein the acquiring an instance of a digital rewards package comprises:
transmitting a request to a remote central server for the remote central server to enumerate instances of a digital rewards package currently held by a user; and
receiving data enumerating instances of a digital rewards package currently held by a user from the remote central server.

14. The one or more memory or storage devices of claim 11, wherein the determining the respective reward for each of the one or more reward slots comprises:
adjusting odds of being awarded one or more of the multiple available rewards; and
randomly selecting the respective reward from the multiple available rewards according to the adjusted odds.

15. The one or more memory or storage devices of claim 14, wherein the adjusting the odds is based, at least in part, on a current state of or inventory held by the user.

16. The one or more memory or storage devices of claim 14, wherein the adjusting the odds is based, at least in part, on data obtained from applying machine learning algorithms to gameplay statistics, reward inventories, or demographic data associated with multiple other users.

17. A system, comprising:
a memory or storage device; and
one or more processors, the one or more processors being configured to implement a dynamic digital rewards system that (a) supports one or more remote clients and thereby reduces memory overhead, processing overhead, or both at the one or more remote clients, and (b) provides digital rewards according to a rewards framework that is modifiable without updating executable code stored at the one or more remote clients.

18. The system of claim 17, wherein the dynamic digital rewards system is programmed to adaptively alter reward-selection likelihoods based at least in part on a current state of a player being awarded a reward.

19. The system of claim 17, wherein the dynamic digital rewards system is programmed to adaptively alter reward-selection likelihoods based at least in part on data obtained from multiple ones of the remote clients.

* * * * *